United States Patent
Joong et al.

(10) Patent No.: US 6,614,137 B2
(45) Date of Patent: Sep. 2, 2003

(54) LINEAR MOTOR, DRIVING AND CONTROL SYSTEM THEREOF AND MANUFACTURING METHOD THEREOF

(75) Inventors: Kim Houng Joong, Hitachi (JP); Kohji Maki, Hitachi (JP); Yoshitaka Iwaji, Hitachi (JP); Taizou Miyazaki, Hitachi (JP); Tomoyuki Hanyu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 09/791,720

(22) Filed: Feb. 26, 2001

(65) Prior Publication Data

US 2002/0043879 A1 Apr. 18, 2002

(30) Foreign Application Priority Data

Oct. 12, 2000 (JP) .......................................... 2000-316844

(51) Int. Cl.[7] .............................................. H02K 41/03
(52) U.S. Cl. ........................................ 310/12; 318/135
(58) Field of Search ............................ 314/12, 13, 14; 318/135

(56) References Cited

U.S. PATENT DOCUMENTS

| | | | |
|---|---|---|---|
| 3,707,924 A | | 1/1973 | Barthalon et al. .......... 104/290 |
| 4,254,350 A | | 3/1981 | Miroshnichenko et al. ... 310/13 |
| 4,703,297 A | | 10/1987 | Nagasaka ................... 335/222 |
| 4,912,746 A | * | 3/1990 | Oishi .......................... 310/12 |
| 4,945,268 A | * | 7/1990 | Nihei et al. .................. 310/12 |
| 5,166,749 A | * | 11/1992 | Curbelo et al. ............. 356/346 |
| 5,426,353 A | * | 6/1995 | Stuhr et al. .................. 318/15 |
| 5,619,112 A | * | 4/1997 | Younessi et al. ............ 318/689 |
| 5,661,350 A | | 8/1997 | Lucidarme et al. .......... 310/12 |
| 6,369,479 B1 | * | 4/2002 | Ochiai et al. .......... 310/156.51 |

FOREIGN PATENT DOCUMENTS

| | | |
|---|---|---|
| DE | 39 15 623 C1 | 12/1990 |
| DE | 44 13 601 A1 | 5/1996 |
| JP | 63-95849 | 4/1988 |
| JP | 63-107452 | 5/1988 |
| JP | 63-310361 A * | 12/1988 |
| JP | 63-310361 | 12/1988 |
| JP | 8-080083 A * | 3/1996 |
| JP | 8-502880 | 3/1996 |
| JP | 10-174418 | 6/1998 |
| WO | WO00/69051 | 11/2000 |

OTHER PUBLICATIONS

Patent Abstracts of Japan 10174418, published Jun. 26, 1998.
U.S. patent application Ser. No. 09/959,615, Kim et al., filed Nov. 2001.

* cited by examiner

*Primary Examiner*—Thomas M. Dougherty
*Assistant Examiner*—Judson H. Jones
(74) *Attorney, Agent, or Firm*—Antonelli, Terry, Stout & Kraus, LLP

(57) ABSTRACT

Leakage of magnetic fluxes passing through the gaps between the magnetic pole teeth of an armature is reduced thereby to reduce a magnetic attraction force between the armature and a mover. A linear motor includes a first member and a second member. The first member is configured with at least a magnetic pole of a first polarity having a first opposed portion and a magnetic pole of a second polarity having a second opposed portion. The second member is held by the first opposed portion, while the second member is held by the second opposed portion and moves relatively. The first member is formed of an iron core and a winding, and the second member is formed of a permanent magnet, a magnetic material, a winding of a single type or a combination of a plurality of types of materials.

28 Claims, 25 Drawing Sheets

Normal

Skew

Normal

Skew

LINEAR MOTOR, DRIVING AND CONTROL SYSTEM THEREOF AND MANUFACTURING METHOD THEREOF

CROSS REFERENCE TO RELATED APPLICATION

This application is related to U.S. application Ser. No. 09/959,6145, filed Nov. 1, 2001, which is a 371 of PCT/JP00/02808, filed Apr. 27, 2000, and published as WO00/69051 on Nov. 16, 2000.

BACKGROUND OF THE INVENTION

The present invention relates to a linear motor, a driving system thereof and a manufacturing method thereof, or in particular a linear motor comprising an armature wound with a coil having two magnetic poles, upper and lower, with alternate magnetic pole teeth in opposed relation to each other, and a control method thereof.

The prior art such as JP-A-63-310361 discloses a linear pulse motor of such a structure that the lead wire processing is simplified to reduce the manufacturing cost. In the structure of such a linear motor, a two-phase pulse rotational motor is expanded linearly.

In the conventional linear motor, the leakage of the magnetic fluxes passing through the gap between the magnetic pole teeth of the magnetic pole plate and the two magnetic poles of the armature is generally so large that the propulsive force of the motor is small as compared with the excitation current. Further, in view of the fact that the magnetic attractive force acts unidirectionally between the armature and the mover, a large burden is imposed on the mover support mechanism, thereby leading to the problem of a distorted structure.

SUMMARY OF THE INVENTION

The object of the present invention is to provide a linear motor and a method of manufacturing thereof, in which the magnetic flux leakage is reduced thereby to reduce the magnetic attraction force between the armature and the mover.

According to one aspect of the invention, there is provided a linear motor comprising a first member and a second member, wherein the first member includes at least a magnetic pole of a first magnetic polarity having a first opposed portion and a magnetic pole of a second magnetic polarity having a second opposed portion, and the second member is held by the first opposed portion and relatively moved by being held by the second opposed portion. The first member is made of an iron core and a winding, and the second member is made of a permanent magnet, a magnetic material or a single type of winding or a combination of a plurality of materials.

According to another aspect of the invention, there is provided a method of manufacturing a linear motor, comprising the steps of producing by segmenting the iron core of the first member vertically or horizontally with respect to the direction of relative movement of the first member and the second member and combining the segmented portions of the first member thereby to produce a magnetic pole of a first magnetic polarity having a first opposed portion and a magnetic pole of a second magnetic polarity having a second opposed portion.

The above and other objects, features and advantages will be made apparent by the detailed description taken in conjunction with the accompanying drawings.

DESCRIPTION OF THE EMBODIMENTS

Figure 1:
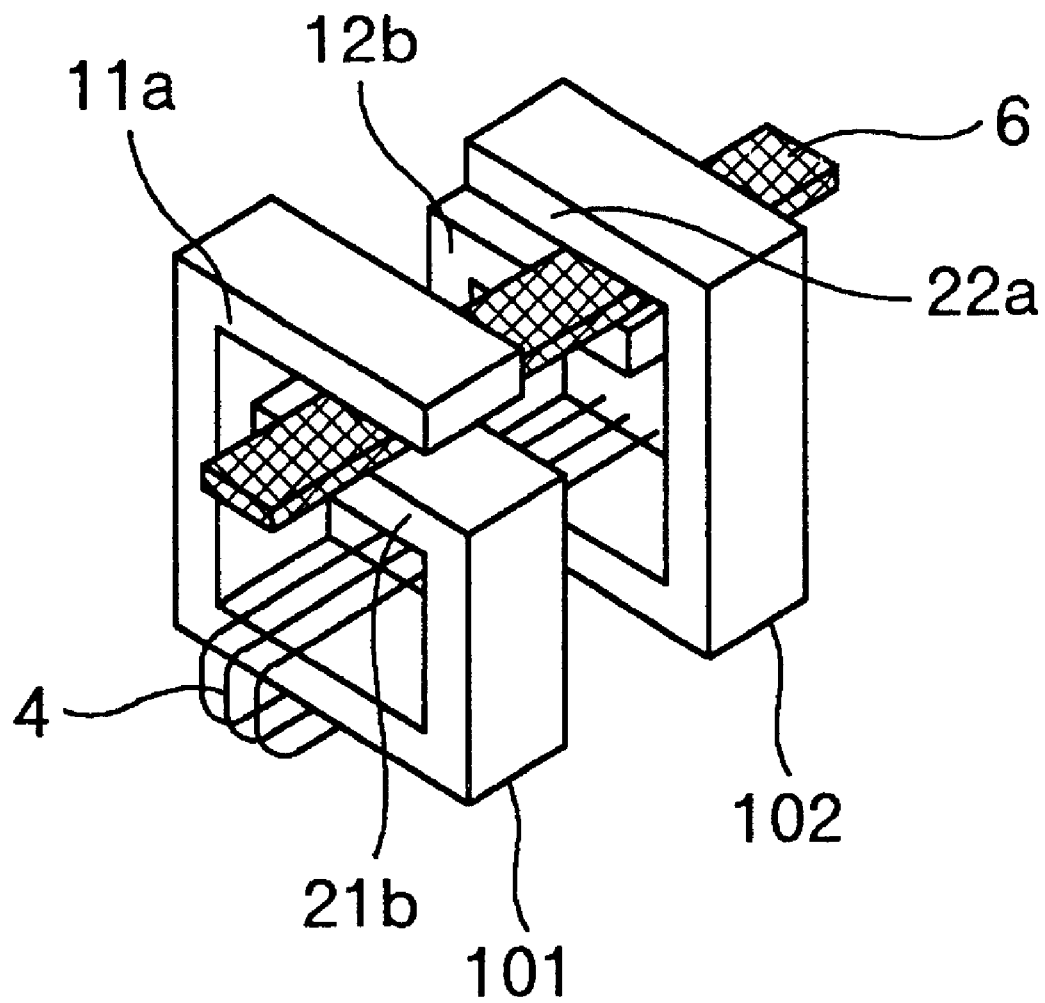
FIG. 1 is a diagram showing a basic configuration of a linear motor according to an embodiment of the invention.

An embodiment of the invention will be described below with reference to the accompanying drawings. In the drawings, the component elements designated by the same reference numerals are the same or equivalent ones, respectively.

FIG. 1 is a diagram showing a basic configuration of a linear motor according to an embodiment of the invention. In FIG. 1, reference numeral 101 designates an iron core having a first opposed portion, and numeral 102 an iron core having a second opposed portion. The iron core 101 and the iron core 102 are so configured that the upper and lower magnetic poles are formed alternately. The upper magnetic pole tooth 11a and the lower magnetic pole tooth 21b of the iron core 101 are defined as the first opposed portion, and the lower magnetic pole tooth 12b and the upper magnetic pole tooth 22a of the iron core 102 as the second opposed portion. Thus, a first member is configured in such a manner that the (2n−1)th iron core makes up the first opposed portion and (2n)th iron core makes up the second opposed portion (n: 1, 2, 3, . . . ).

Also, as shown in FIG. 1, the iron core 101 and the iron core 102 accommodate one winding 4. A second member 6 is held by the first opposed portion of the iron core 101, and a second member is held by the second opposed portion of the iron core 102 and adapted to move relatively to the first member, thereby making up a linear motor. The first member is configured with the iron core 101 and the iron core 102, and the second member is made of a permanent magnet, a magnetic material or a single type of winding or a combination of a plurality of materials.

Figure 2:
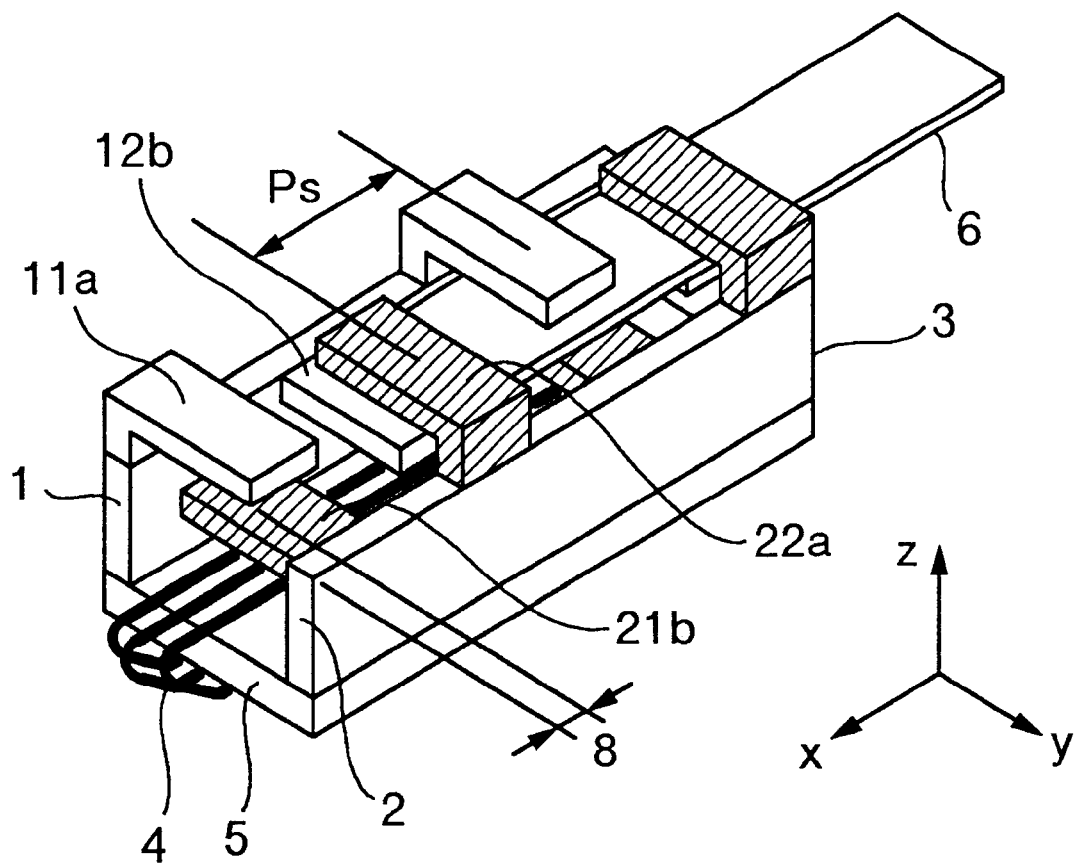
FIG. 2 is a diagram schematically showing a linear motor according to another embodiment of the invention.
Figure 3:
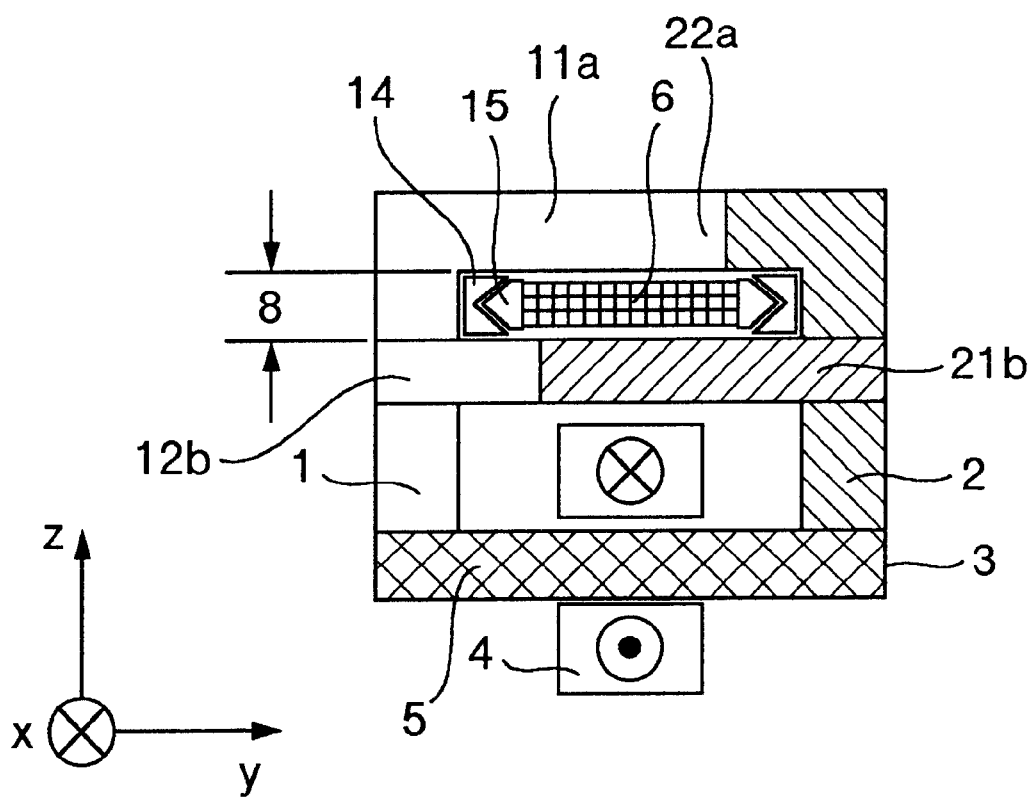
FIG. 3 is a sectional view of the linear motor shown in FIG. 1.

FIG. 2 is a diagram schematically showing a linear motor according to another embodiment of the invention. A sectional view of this linear motor is shown in FIG. 3. In FIG. 2, the first member includes an alternate arrangement of a plurality of the first opposed portions and the second opposed portions shown in FIG. 1, and the parts thereof other than those holding the second member 6 are formed as a unit. Numeral 1 designates a magnetic pole, numeral 11a an upper magnetic pole tooth of the magnetic pole 1, numeral 12b a lower magnetic pole tooth of the magnetic pole 1, numeral 2 a magnetic pole, numeral 21 a lower magnetic pole tooth of the magnetic pole 2, numeral 22a an upper magnetic pole tooth of the magnetic pole 2, numeral 3 a first member, numeral 4 a winding, numeral 5 an iron core, numeral 6 a second member, numeral 8 a gap between the upper magnetic pole tooth 11a of the magnetic pole 1 and the lower magnetic pole tooth 21b of the magnetic pole 2 (the lower magnetic pole tooth 12b of the magnetic pole 1 and the upper magnetic pole tooth 22a of the magnetic pole 2), and character Ps the pole pitch between the centers of the magnetic pole teeth of the first opposed portion and the second opposed portion. The magnetic poles 1, 2 are arranged on the two sides of the iron core 5 on the bottom portion of the first member 3, and the winding 4 is wound longitudinally on a linear elongate iron core having a channel-shaped section open upside thereby to hold the two magnetic poles 1, 2.

As shown in FIGS. 2 and 3, the magnetic pole 1 has on the upper surface thereof the upper magnetic pole tooth 11a, the lower magnetic pole tooth 12b and so forth protruded toward the magnetic pole 2, while the magnetic pole 2 has on the upper surface thereof the lower magnetic pole tooth 21b, the upper magnetic pole tooth 22a and so forth protruded toward the magnetic pole 1. Specifically, the (2n−1)th (n: 1, 2, 3, . . . ) protruded magnetic pole tooth of the magnetic pole 1 is arranged upside and the (2n)th (n: 1, 2, 3, . . . ) magnetic pole tooth is arranged downside so as to form two stages of the magnetic pole teeth. In contrast with the magnetic pole 1, the (2n−1)th protruded magnetic pole tooth of the magnetic pole 2 is arranged downside and the (2n)th (n: 1, 2, 3, . . . ) magnetic pole tooth thereof is arranged upside so as to form two similar stages of the magnetic pole teeth. The upper magnetic pole teeth of the magnetic pole 1 and the magnetic pole 2 as a whole are defined as an upper magnetic pole surface, and the lower magnetic pole teeth as a whole defined as a lower magnetic pole surface. Then, the magnetic pole teeth of the magnetic pole 1 and the magnetic pole 2 in opposed relation to each other form two alternate upper and lower magnetic pole surfaces.

As shown in FIGS. 2 and 3, the first upper magnetic pole tooth 11a and the lower magnetic pole tooth 21b are defined as the first opposed portion, and the second lower magnetic pole tooth 12b and the upper magnetic pole tooth 22a as the second opposed portion. Thus, a first member is configured so that the (2n−1)th magnetic pole tooth is the first opposed portion and the (2n)th magnetic pole tooth is the second opposed portion. Also, a predetermined gap 8 is formed between the upper magnetic pole tooth and the lower magnetic pole tooth of each opposed portion, and a second member is inserted through the gap 8. Then, the second member is held by the first opposed portion thereby to form a structure in which the second member is held by the second opposed portion. In the gap between the upper magnetic pole tooth and the lower magnetic pole tooth of each opposed portion of the linear motor according to this embodiment, therefore, a first member with the magnetic fluxes alternately flowing between the upper and lower magnetic pole teeth is formed, so that the second member moves relatively through the gap.

In FIG. 3, a support mechanism (first member side) 14 supports the second member 6 relatively moving on the first member 3 side, and a support mechanism (second member side) 15 supports the second member 6 relatively moving on the second member 6 side. The second member 6, supported on the support mechanisms 14, 15, relatively moves through the gap 8 in such a manner as to pass through a tunnel. In the linear motor according to this embodiment, the attraction force acting between the second member 6 and the upper magnetic pole tooth is substantially the same in magnitude as the attraction force acting between the second member 6 and the lower magnetic pole tooth, and the two attraction forces work in opposite directions. Thus, the attraction force is reduced as a whole. As a result, the attraction force between the second member 6 and the magnetic pole tooth of the first member 3 can be reduced for a smaller burden on the support mechanisms 14, 15.

Figure 4:
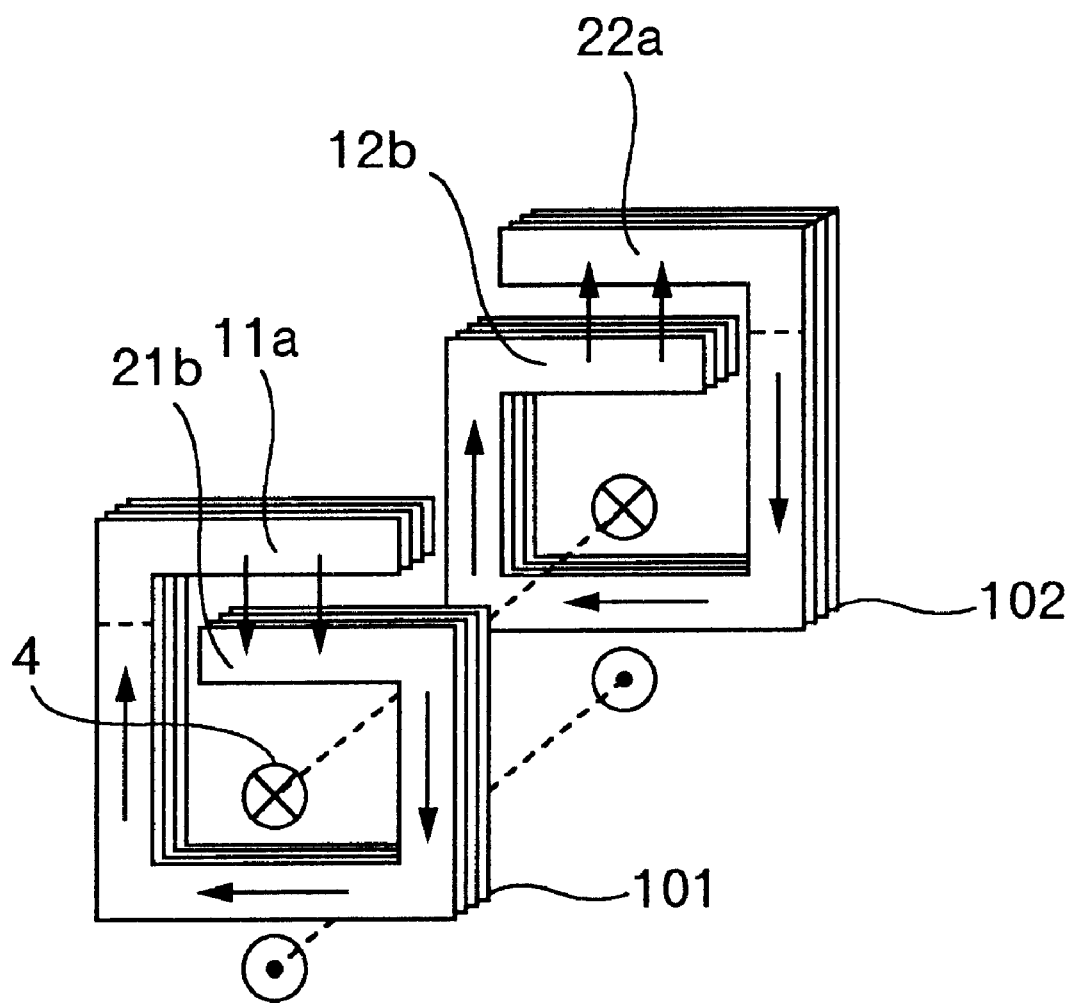
FIG. 4 is schematic diagram showing the flow of magnetic fluxes of the linear motor shown in FIG. 1.

FIG. 4 is a diagram schematically showing the flow of the magnetic fluxes in the linear motor according to this embodiment. Upon excitation of the winding 4, the upper and lower magnetic pole teeth mounted on the magnetic pole 2 assume a S pole in the case where the upper and lower magnetic pole teeth mounted on the magnetic pole 1 are a N pole. In this case, the magnetic fluxes flow from the upper magnetic pole tooth 11a of the magnetic pole 1 to the lower magnetic pole tooth 21b of the magnetic pole 2. In similar fashion, the magnetic fluxes flow from the lower magnetic pole tooth 12*b* of the magnetic pole 1 to the upper magnetic pole tooth 22*a* of the magnetic pole 2. Thus, the magnetic fluxes flow in opposite directions for each pole pitch in the gap 8 between the upper magnetic pole surface and the lower magnetic pole surface. Further, the magnetic path of the magnetic circuit of effective magnetic fluxes is shortened, the magnetic reactance decreases, the effective magnetic fluxes increase, and the leakage magnetic fluxes are reduced.

Figure 5A:
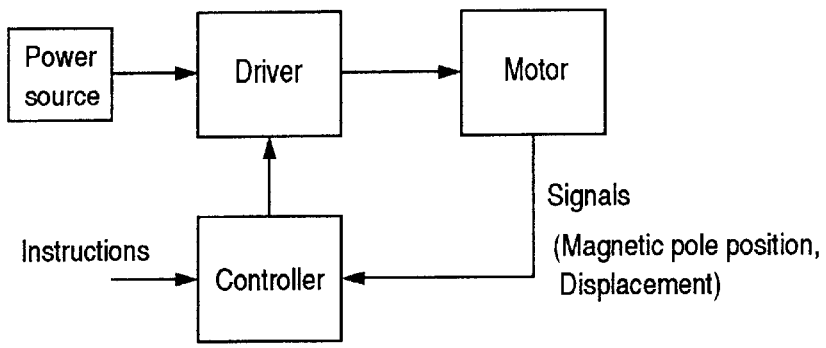
FIGS. 5A to 5D are control block diagrams for a linear motor according to an embodiment.

FIGS. 5A to 5D are block diagrams showing the control operation using a linear motor according to this embodiment. FIG. 5A is a block diagram showing a closed loop control system including a linear motor (indicated as "Motor" in the drawing) including the first member and the second member described above, a sensor (not shown) for detecting the relative displacement (indicated as "Displacement" in the drawing) of the first member and the second member and the magnetic pole (indicated as "Magnetic pole position" in the drawing) and a control unit (indicated as "Controller" in the drawing) for feeding back the signals (indicated as "Signals" in the drawing) of the sensor and a power drive unit (indicated as "Driver" in the drawing) for driving the linear motor with power from an external power source or an internal power source (indicated as "Power source" in the drawing). The control unit is supplied with instructions (indicated as "Instructions" in the drawing) such as a speed instruction from other sources.

Figure 5B:
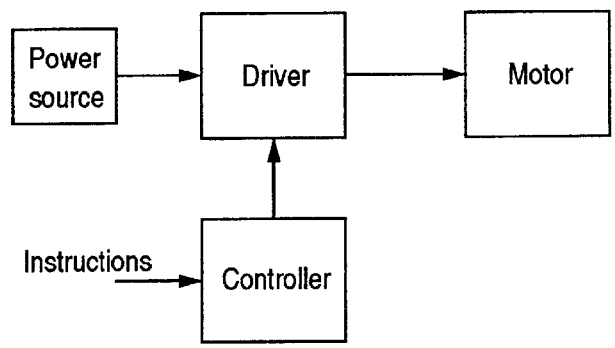

FIG. 5B is another block diagram showing an open loop control system including a linear motor (indicated as "Motor" in the drawing) including the first member and the second member, a control unit (indicated as "Controller" in the drawing) and a power drive unit (indicated as "Driver" in the drawing).

Figure 5C:
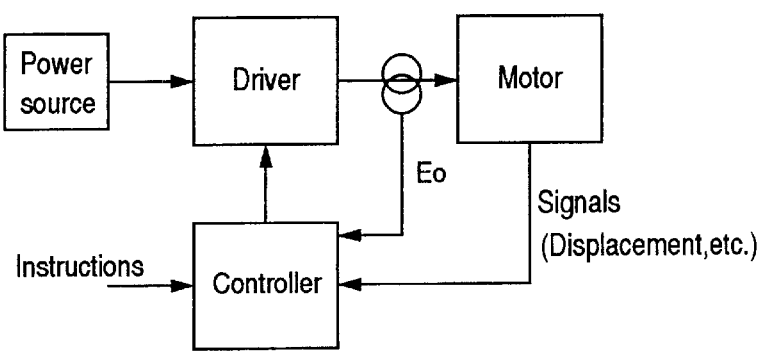

FIG. 5C is still another block diagram showing a magnetic pole sensorless control system including a linear motor (indicated as "Motor" in the drawing) having the first member and the second member, a voltage sensor, a control unit (indicated as "Controller" in the drawing) and a power drive unit (indicated as "Driver" in the drawing). According to this embodiment, the induced voltage (indicated as "Eo" in the drawing) generated by the linear motor is read into the control unit by use of the voltage sensor. In the control unit, the magnetic pole position is estimated from the magnitude of the induced voltage, and a signal for driving the linear motor is output to the power drive unit (indicated as "Driver" in the drawing). In the control system having this configuration, the linear motor can be driven stably without mounting a magnetic pole position sensor on the linear motor unit.

Figure 5D:
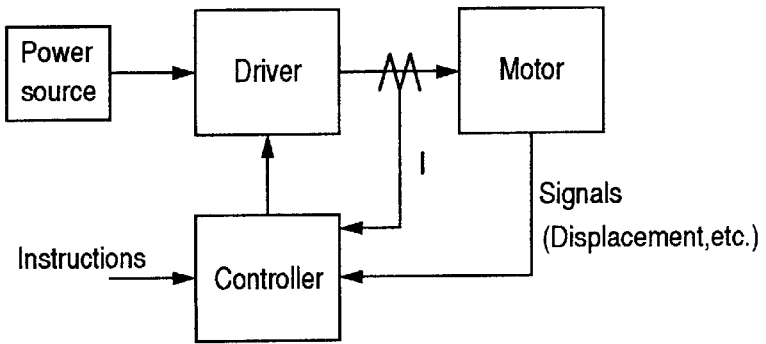

FIG. 5D is still another block diagram showing a configuration of a magnetic pole sensorless control system including a linear motor (indicated as "Motor" in the drawing) having the first member and the second member, a current sensor, a control unit (indicated as "Controller" in the drawing) and a power drive unit (indicated as "Driver" in the drawing). According to this embodiment, the current (indicated as "I" in the drawing) flowing in the linear motor is read into the control unit by use of the current sensor. In the control unit, the induced voltage of the linear motor is calculated and the magnetic pole position is estimated from the detection current value and the voltage applied to the linear motor. With the control system having this configuration, the linear motor can be driven stably without mounting a magnetic pole position sensor on the linear motor unit.

Figure 6:
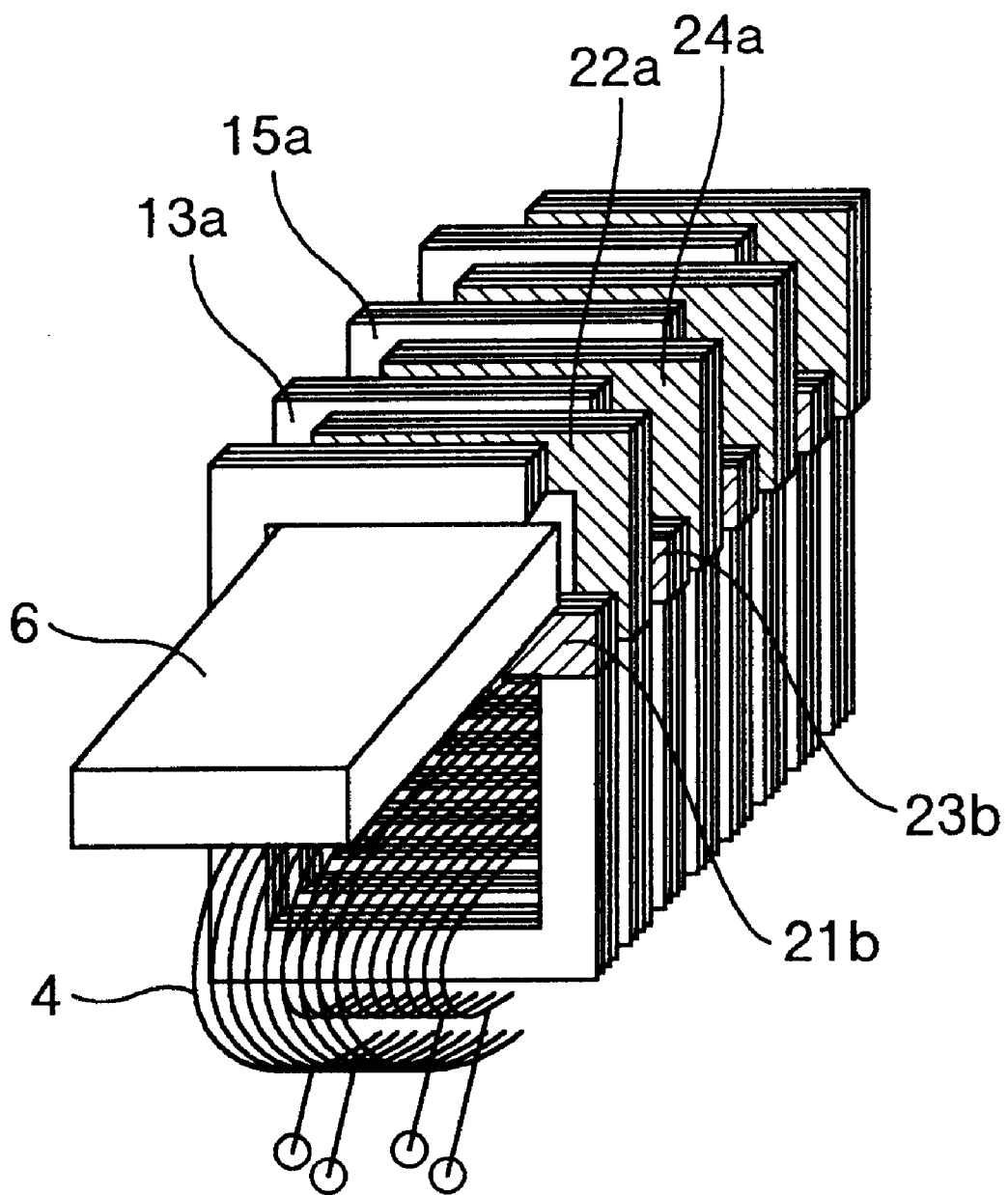
FIG. 6 is a diagram schematically showing the assembly of a linear motor configured of a steel laminate according to an embodiment of the invention.

A schematic diagram and an exploded view of a linear motor configured of a steel laminate according to this embodiment are shown in FIGS. 6 and 7, respectively. In FIG. 6, the first member is formed of a steel laminate as shown in FIG. 4, and has such a structure that a plurality of the first opposed portions and the second opposed portions are arranged alternately. FIG. 7 shows a method of manufacturing a linear motor comprising the first member and the second member, in which the iron core portion with the winding of the first member arranged therein and the magnetic pole portion having the opposed portion holding the second member are assembled from steel laminates in segmentation.

Figure 7A:
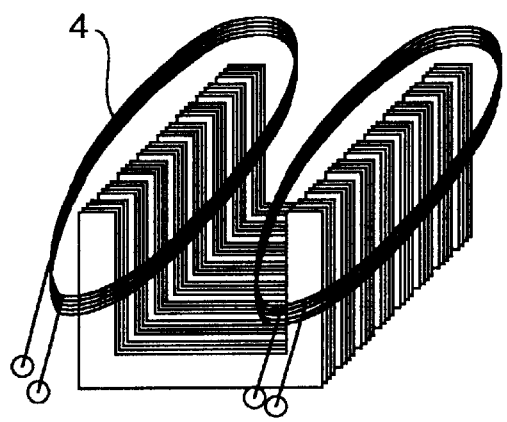
FIGS. 7A to 7C are schematic diagrams showing an exploded view of the linear motor configured of a steel laminate shown in FIG. 6.
Figure 7C:
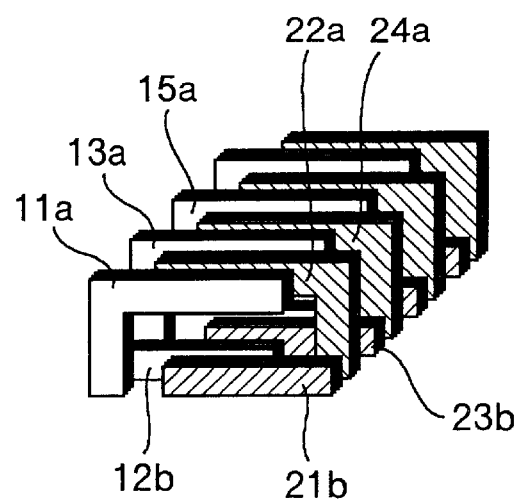
Figure 7B:
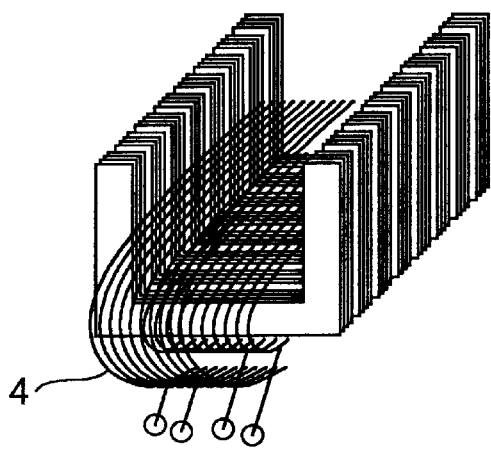

FIGS. 7A and 7B schematically show the case in which the winding of the first member is accommodated and arranged at the ends (FIG. 7A) and the case in which it is arranged at the center (FIG. 7B) of the iron core portion open in the shape of a channel. A single excitation winding is used for the first member so that the direction of the current flow is switched alternately by the drive circuit (called the unifilar winding). As an alternative, two windings for the first member are wound in opposite directions on the same iron core and a current is supplied to the alternate windings in the same direction from the drive circuit (called the bifilar winding). Either the unifilar winding or the bifilar winding can be used for any of the methods of arranging the winding 4 shown in FIGS. 7A and 7B.

Also, FIG. 7C shows a magnetic pole unit having an opposed portion holding the second member. As shown in FIGS. 7A to 7C, a linear motor of a simple structure can be manufactured by assembling by segmentation the iron core portion with the winding of the first member arranged thereon and the magnetic pole portion having the opposed portion holding the second member. An assembly method is available for fastening with bolts or rivets (not shown), welding or integration using resin.

The advantage of the winding process with a segmented core will be explained. In the case where the winding 4 is arranged on the integrated assembly including the iron core portion with the winding of the first member arranged thereon and the core of the magnetic pole portion having the opposed portion holding the second member, windings as many as turns thereof are required to be passed along the steel laminate thickness of the iron core portion. The winding 4 can be easily inserted as shown in FIGS. 7A to 7C, however, by manufacturing by segmentation the iron core portion with the winding of the first member arranged thereon and the core of the magnetic pole portion having the opposed portion holding the second member.

Figure 19:
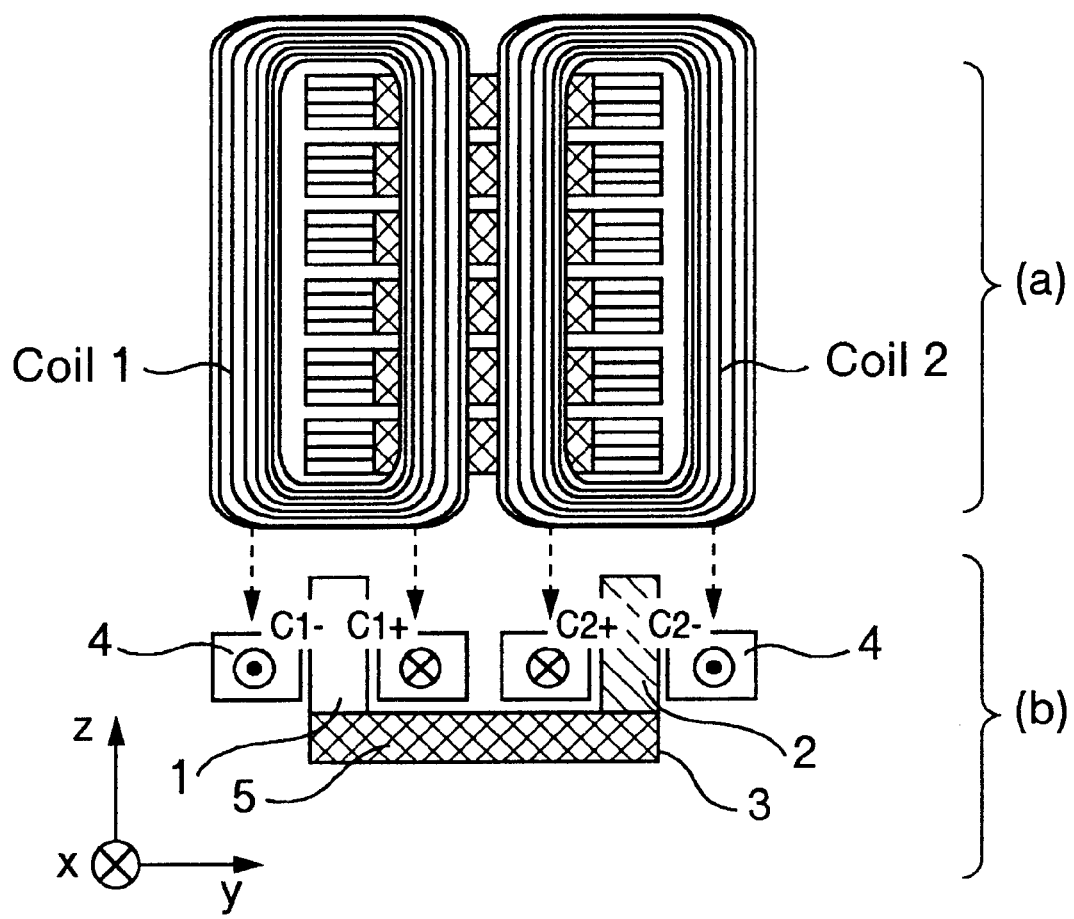
FIG. 19 is a plan view and a sectional view of the first member according to another embodiment of the invention.

FIG. 19 is a plan view (a) and a sectional view (b) of the winding 4 of FIG. 7A accommodated in channel-shaped steel laminates (1, 2, 3, 5). A predetermined interval is maintained between the magnetic poles formed of the steel laminates (1, 2, 3, 5) using a duct or resin (not shown). In FIG. 19, the two windings 4 are arranged as a coil 1 and a coil 2 to surround the pole portions (1, 2) of the steel laminates.

Figure 20:
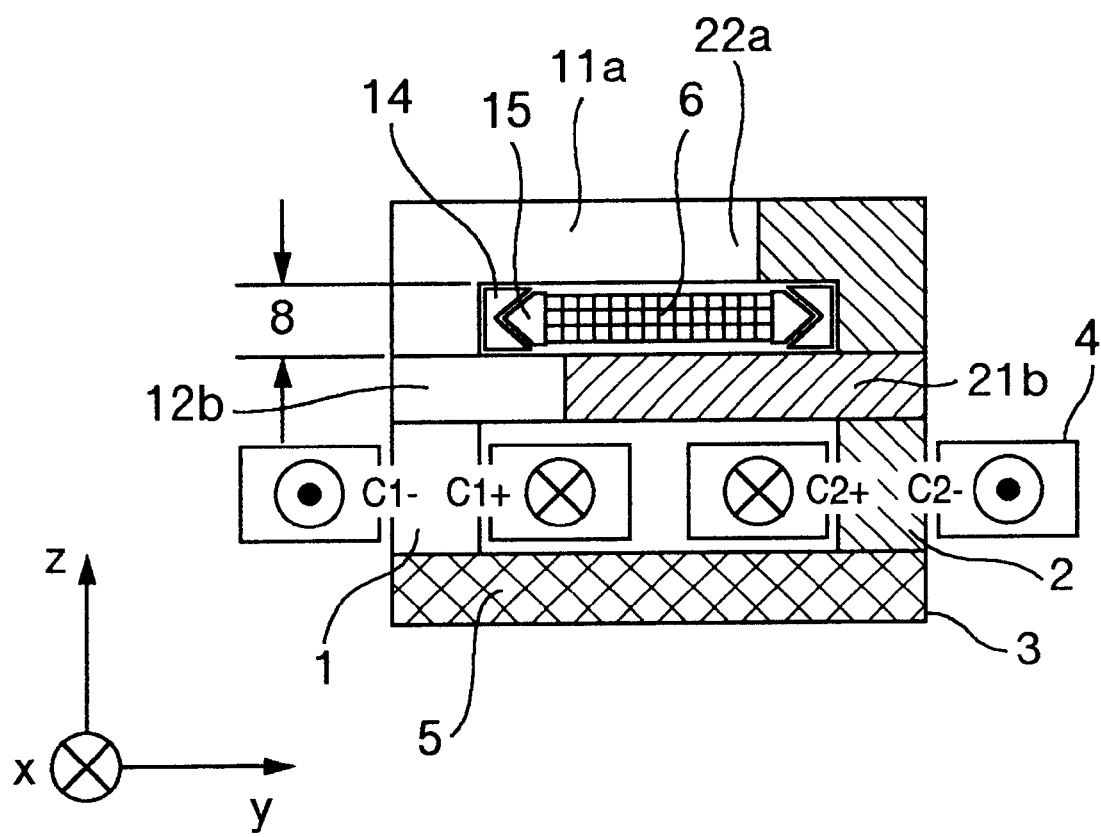
FIG. 20 is a sectional view of a linear motor according to another embodiment of the invention.

FIG. 20 is a sectional view showing a combination of FIGS. 7A and 7C. In FIG. 20, the second member 6, like in FIG. 3, is supported by the support mechanisms 14, 15 and adapted to move relatively through the gap 8 in such a manner as to pass through a tunnel.

Figure 8A:
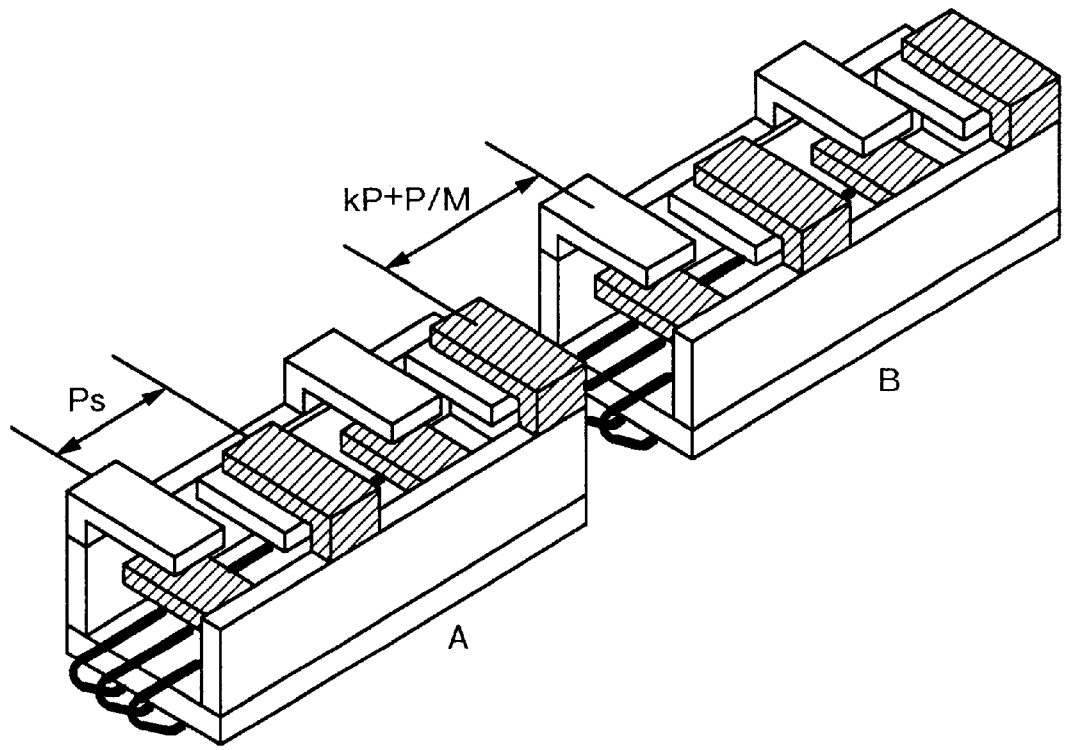
FIGS. 8A to 8B are schematic diagrams showing a linear motor comprising two first members arranged in series according to this invention.
Figure 8B:
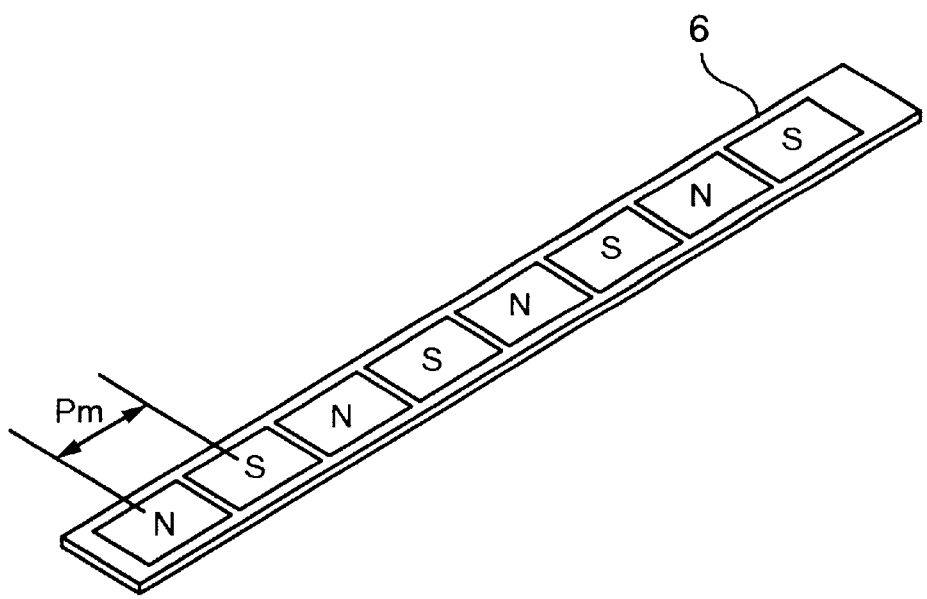

Now, an explanation will be given of the structure of a linear motor comprising a plurality of the first members 3 of FIG. 2 arranged in series or in parallel. As an example, FIG. 8A shows a linear motor comprising the two first members of FIG. 2 arranged in series. In FIG. 8A, generally, the first member A and the first member B are arranged in series so that the pitch between the magnetic pole teeth of the first member A and the adjacent magnetic pole teeth of the first member B is given as (k·P+P/M){k: 0, 1, 2, ..., and M: 2, 3, 4, ...}, where P is the pole pitch (selected as the armature magnetic pole pitch Ps or as the second member pole pitch Pm), and M is the number of phases of the motor. In FIG. 8B, the second member 6 has a plurality of permanent magnets 7 arranged with adjacent magnetic poles in different polarities and magnetized in the Z direction as shown in FIG. 3. Upon excitation of the winding 4 of the first member A and the second member B in such a manner as to generate a moving magnetic field alternately, magnetic fluxes flow in the gap 8 between the upper magnetic pole surface and the lower magnetic pole surface in opposite directions for each pole pitch. As a result, the propulsive force is generated by the pitch P/2 essential for movement and the second member 6 moves relatively.

Figure 9A:
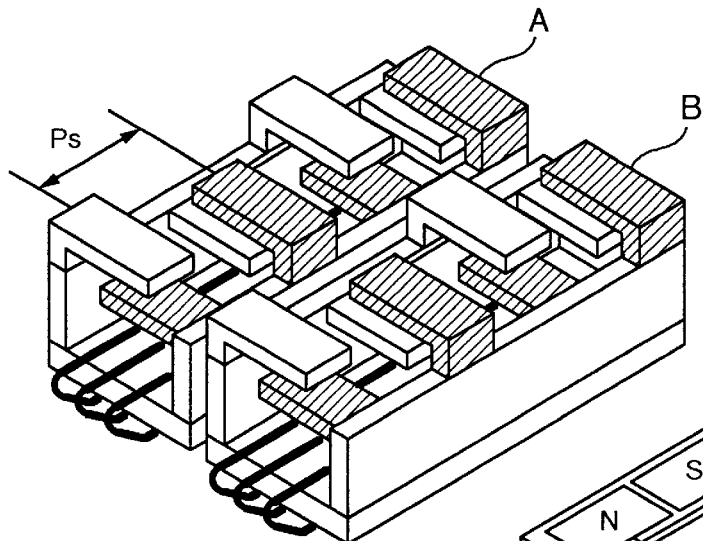
FIGS. 9A to 9B are diagrams showing a linear motor comprising two first members arranged in parallel according to this invention.
Figure 9B:
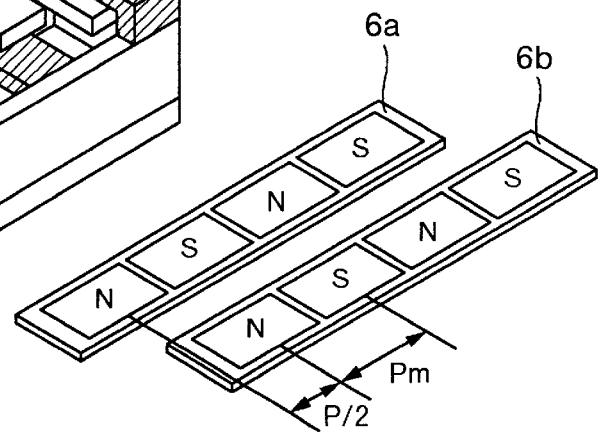

As another example, FIG. 9A shows a linear motor comprising two first members of FIG. 2 arranged in parallel. In FIG. 9B, the second member 6a and the second member 6b are integrated by being displaced by a pitch of P/2. As an alternative, the second member 6a and the second member 6b may be aligned while the first member A and the second member B may be displaced by the pitch P/2.

In FIGS. 8A to 9B, the magnetic pole pitch Ps of the first member and the magnetic pole pitch Pm of the second member may have the same or different values. In the case where the magnetic pole pitch Ps of the first member and the magnetic pole pitch Pm of the second member have different values, the pulsation of the propulsive force acting between the permanent magnet 7 and the magnetic pole teeth can be reduced.

Apart from the description with reference to FIG. 8A referring to the case in which two first members are arranged in series, a similar result is obtained by arranging a plurality of first members in series. This is also the case with the description with reference to FIG. 9A showing the case in which two first members are arranged in parallel and two second members are integrated. In this case, too, a similar effect is obtained by arranging a plurality of first members in parallel and integrating a plurality of second members.

Figure 18:
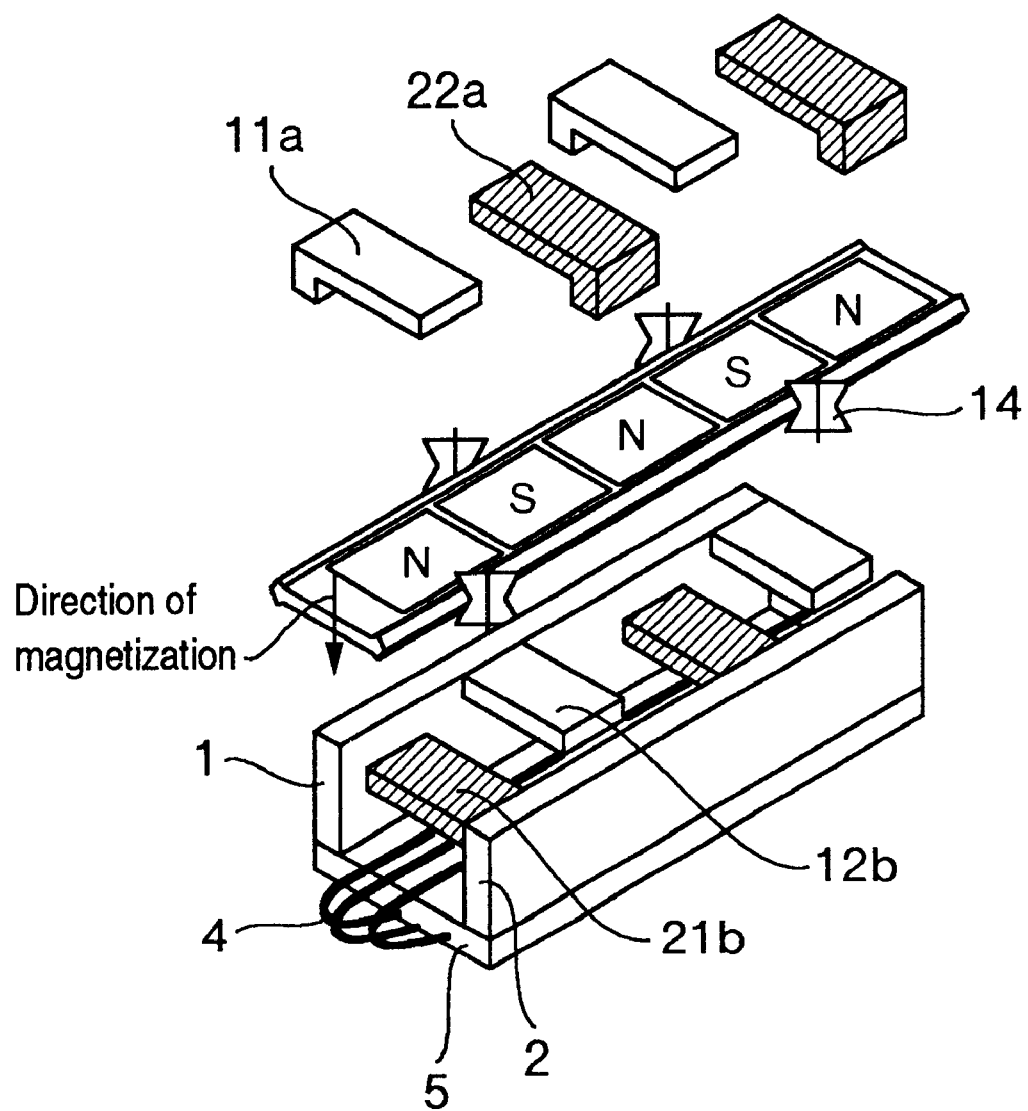
FIG. 18 is a diagram showing still another method of manufacturing a linear motor according to this invention.

FIG. 18 is an exploded view of a part of the linear motor shown in FIG. 8A. The magnetic poles 1, 2 and the magnetic pole teeth 11a, 12b, 21b, 22a are produced by segmentation, and the magnetic pole 1 is combined with the magnetic pole teeth 11a, 12b and the magnetic pole 2 with the magnetic pole teeth 21b, 22a thereby to produce the first member. In this case, the magnetic pole on one side can be integrated with the upper and lower magnetic pole teeth of the same magnetic pole by pressing. Further, the magnetic poles on the two sides can be combined with the magnetic pole teeth thereof by pressing. The support mechanism 14 is fixed on the first member to support the second member horizontally and vertically. The arrow in the drawing indicates the direction of magnetization (indicated as "Direction of magnetization" in the drawing).

Figure 10A:
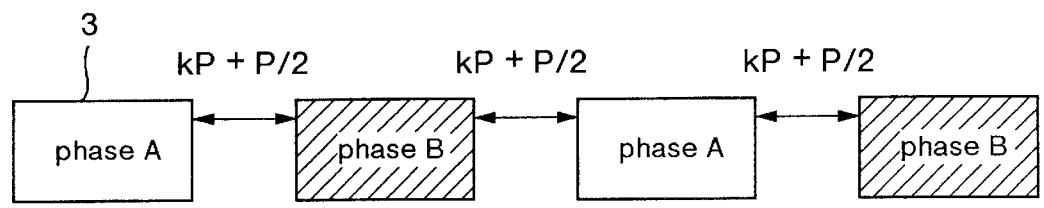
FIGS. 10A to 10B are schematic diagrams showing first members arranged in series according to another embodiment of the invention.
Figure 10B:
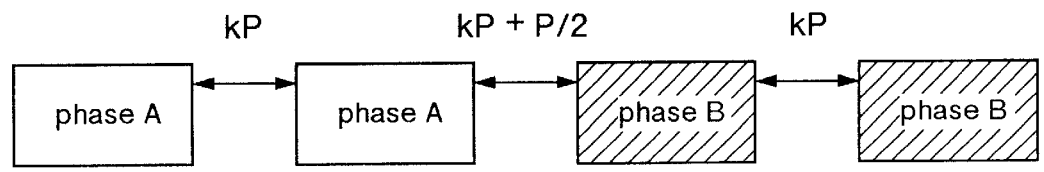

FIGS. 10A to 10B are schematic diagrams showing the first members arranged in series according to another embodiment of the invention. In FIGS. 10A and 10B, four first members are arranged, of which each two first members are assumed to represent one phase, and the pole pitch is given as P. A series arrangement of two-phase linear motors is shown, in which the pitch of the magnetic pole teeth of adjacent first members of the same phase is given as (kP) {k: 0, 1, 2, ...}, and the pitch of the magnetic pole teeth of adjacent first members of different polarities is given as (kP+P/M) {k: 0, 1, 2, ..., and M: 2, 3, 4, ...} {k is the number that can be selected freely within the range in which adjacent first members can be arranged, and M the number of phases of the motor}. FIG. 10A shows an arrangement of phase A, phase B, phase A and phase B of the first members in that order, and FIG. 10B shows an arrangement of phase A, phase A, phase B and phase B of the first members in that order.

Figure 11:
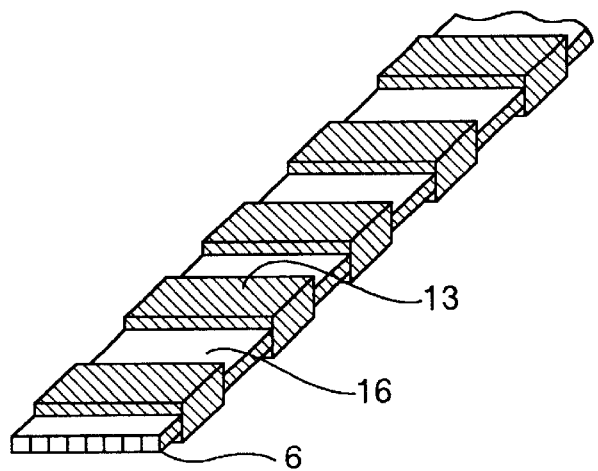
FIG. 11 is a diagram showing a first configuration of the second member according to another embodiment of the invention.
Figure 12:
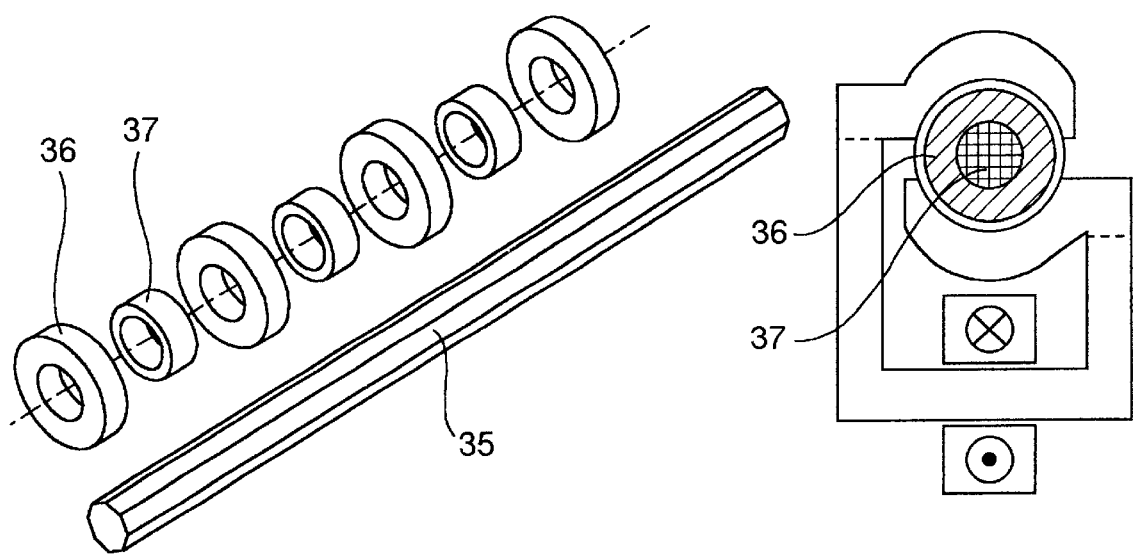
FIG. 12 is a diagram showing a second configuration of the second member according to another embodiment of the invention.

As shown in FIGS. 10A to 10B, a linear motor having a large propulsive force can be obtained by arranging a plurality (multiplicity) of first members in one phase. Instead of arranging four first members of which two first members represent one phase as shown in FIGS. 10A to 10B, a similar effect can be obtained by arranging a plurality of first members in series. This is also the case in which a plurality of first members are arranged in parallel and a plurality of second members are integrated with each other. FIG. 11 shows a tabular second member according to another embodiment of the invention. FIG. 12 shows an example in which the second member is cylindrical instead of tabular unlike in FIG. 11.

In FIG. 11, the provision of protruded magnetic pole teeth 13 on the two sides of a tabular ferromagnetic material changes the magnetic reactance with the magnetic pole of the opposed portion of the first member in the direction of progress. Specifically, the magnetic reactance between the protruded magnetic pole teeth 13 and the magnetic pole of the opposed portion of the first member is smaller than the magnetic reactance between the tabular portion 16 of the ferromagnetic material and the magnetic pole of the opposed portion of the first member. A movable second member can be obtained by utilizing this change of magnetic reactance. It is also possible to obtain a composite second member by providing the protruded magnetic pole teeth 13 of a ferromagnetic material and arranging a permanent magnet on the tabular portion 16. Also, the tabular portion 16 can be formed as a non-magnetic material in combination with the protruded magnetic pole teeth 13 of a ferromagnetic material.

In FIG. 12, assume that the ferromagnetic material 36 and the non-magnetic material 37 are combined on a shaft 35. As another alternative, a permanent magnet may be used.

In FIGS. 11 and 12, the second member 6 may be formed as an endless belt or chain (not shown) with a ferromagnetic material embedded therein. Also, a permanent magnetic may be used alternatively.

Figure 13:
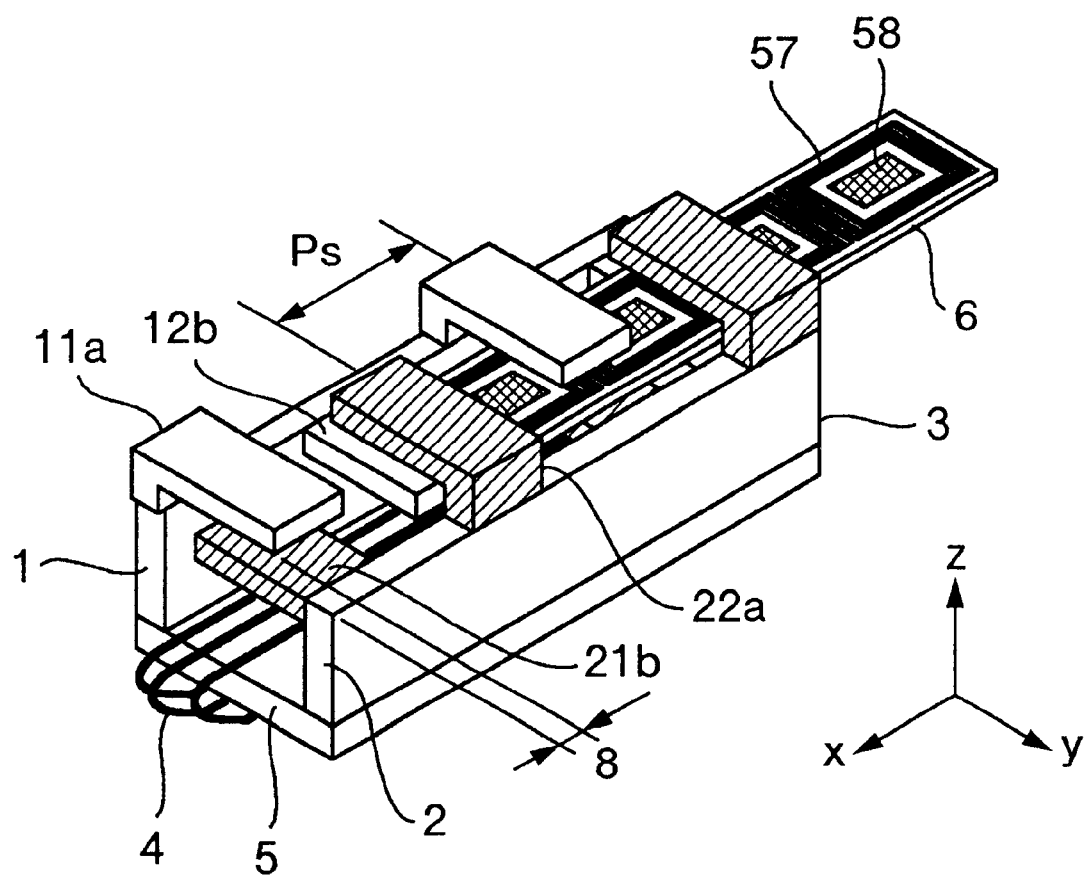
FIG. 13 is a diagram showing a configuration of a linear motor according to still another embodiment of the invention.

FIG. 13 schematically shows a linear motor according to another embodiment of the invention. With reference to FIG. 13, an explanation will be given of an embodiment of the invention using a winding 57 in place of the permanent magnet 7 as a second member. FIG. 13 represents an example in which the winding 57 is used in place of the permanent magnet 7 as a second member. The relative movement is made possible by a configuration in which the winding 4 of the first member has the function of a field winding due to DC excitation and the winding 57 of the second member has the function of an armature winding for generating a moving magnetic field of a plurality of phases with a lead wire (not shown).

In the case where the permanent magnet 7 is used as the second member shown in FIG. 8, a force (called the detent force) is generated between the permanent magnet 7 of the second member and the magnetic pole of the opposed portion of the first member even when the winding 4 of the first member is not excited. As shown in FIG. 13, the use of the winding 57 in place of the permanent magnet 7 as the second member has the effect of eliminating the detent force which otherwise might act between the first member and the second member during no excitation.

Referring to FIG. 13, the winding 57 of the second member can be provided either as a winding type with a core making up the winding 57 with the ferromagnetic material 58 or as a coreless winding type (also called the hollow coil type) making up the winding 57 without the ferromagnetic material 58.

Figure 14A:
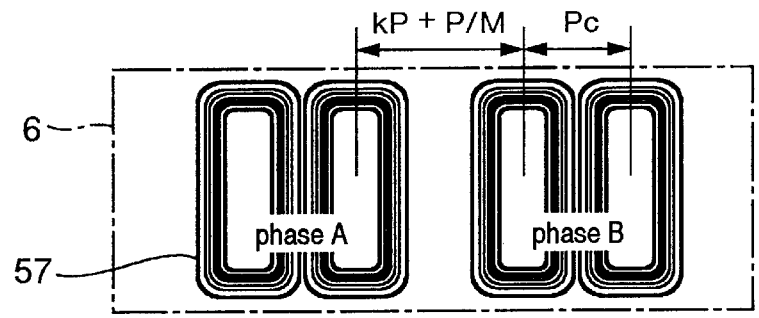
FIGS. 14A to 14B are diagrams showing a configuration (two-phase motor) of the second member of the linear motor of FIG. 13 according to yet another embodiment.
Figure 14B:
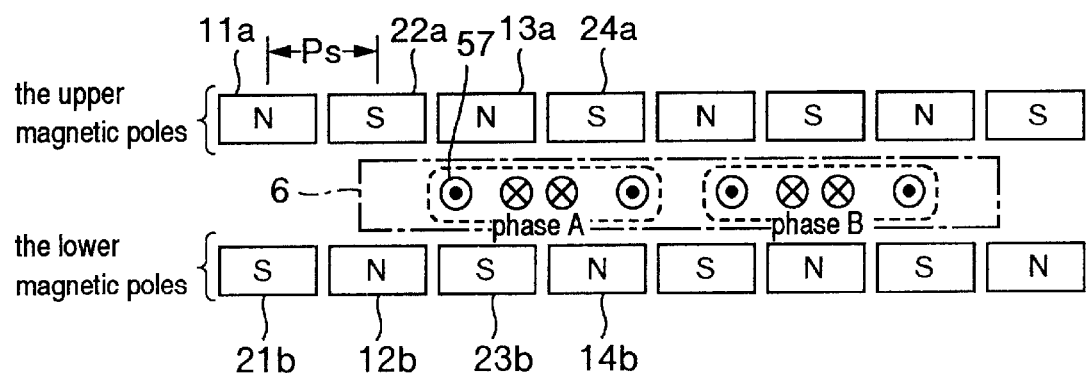

FIG. 14 shows an example in which the winding of the second member shown in FIG. 13 is arranged for a two-phase linear motor. FIG. 14A is a schematic diagram showing an arrangement of the winding 57 including phase A (indicated so in the drawing) and phase B (indicated so in the drawing) for the second member 6. FIG. 14B is a sectional view showing the second member of FIG. 14A held by the upper and lower magnetic pole teeth having the opposed portion of the first member. The winding 4 of the first member shown in FIG. 13 has the function of a field winding due to DC excitation, and the winding 57 is given a two-phase moving magnetic field by a power driver (not shown), so that the first and second members move relatively to each other. The upper magnetic pole teeth are indicated as "the upper magnetic poles" and the lower magnetic pole teeth are indicated as "the lower magnetic poles" in the drawing.

Figure 15A:
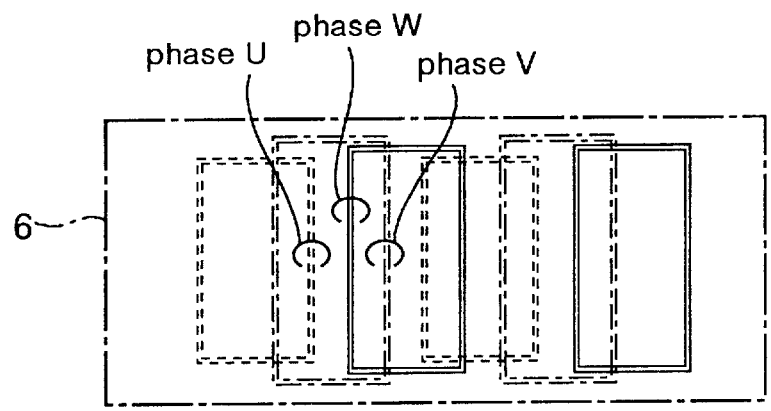
FIGS. 15A to 15B are diagrams showing a configuration (three-phase motor) of the second member of the linear motor of FIG. 13 according to yet another embodiment.
Figure 15B:
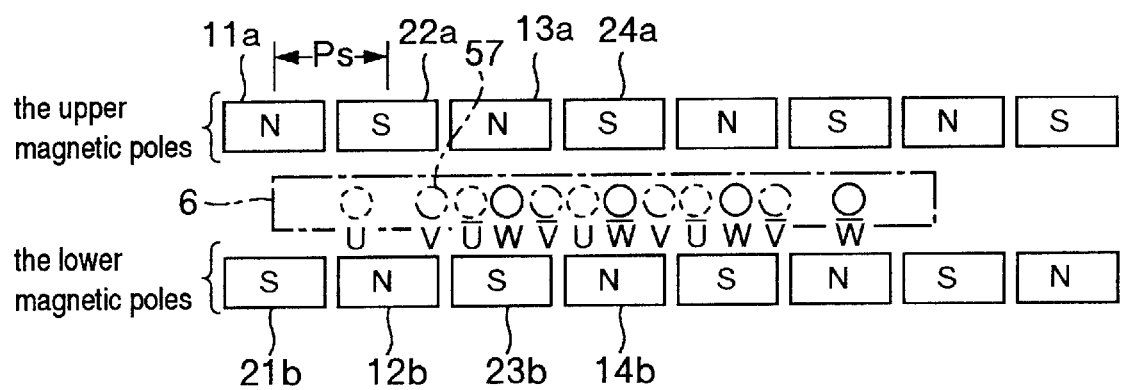
Figure 16A:
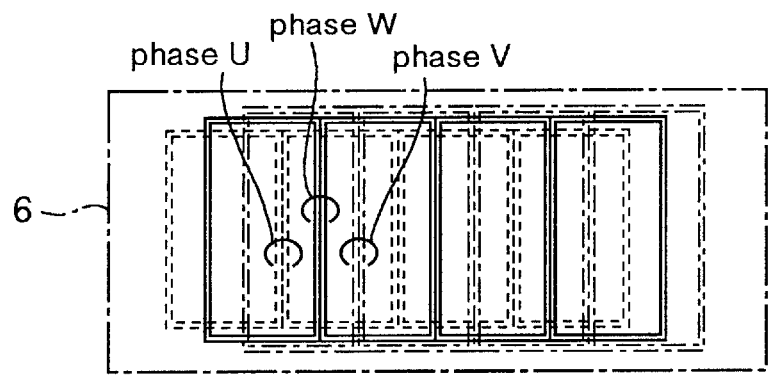
FIGS. 16A to 16B are diagrams showing a configuration (three-phase motor) of the second member of the linear motor of FIG. 13 according to yet another embodiment.
Figure 16B:
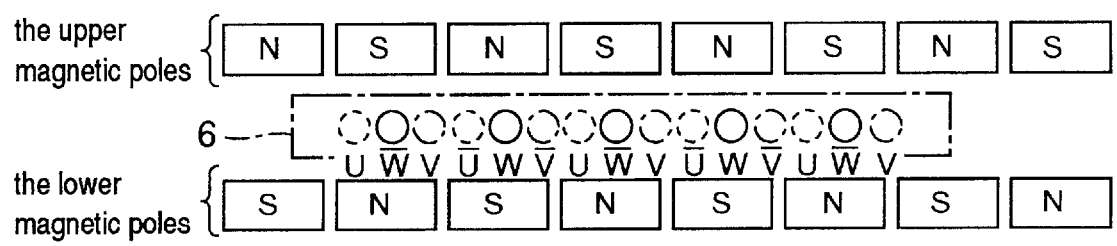

FIGS. 15A and 15B show an example in which the winding of the second member 6 shown in FIG. 13 is arranged as a three-phase linear motor. FIGS. 16A and 16B show another embodiment in which the number of bundles of the windings of the second member 6 shown in FIGS. 15A and 15B is doubled. Both FIGS. 15A, 15B and 16A, 16B show the case in which the winding arrangement of the second member makes up a three-phase motor. Nevertheless, the basic operating principle of these cases is the same as that described with reference to FIG. 13, and the winding 57 is supplied with a three-phase moving magnetic field by a power driver (not shown) thereby to cause relative movements of the first and second members. In FIGS. 15A, 15B and 16A, 16B, the three-phase winding is indicated as "phase U" or "U", "phase V" or "V" and "phase W" or "W", respectively. Like in FIGS. 14A, 14B, the upper magnetic pole teeth are indicated as "the upper magnetic poles", and the lower magnetic pole teeth as "the lower magnetic poles".

Figure 17:
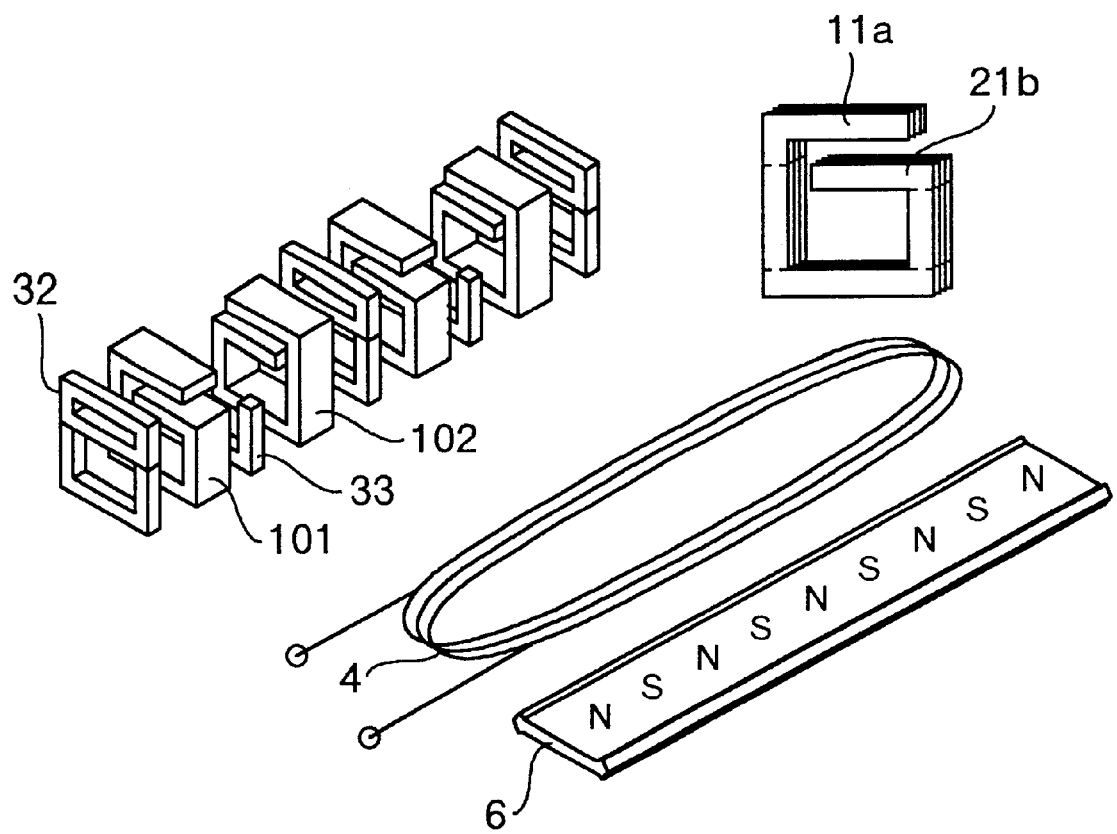
FIG. 17 is a diagram showing another method of manufacturing a linear motor according to this invention.

FIG. 17 shows a method of manufacturing a linear motor according to an embodiment of the invention. In this manufacturing method, the iron core wound with the winding 4, the magnetic poles on the two sides, the upper magnetic pole teeth 11a and the lower magnetic pole teeth 21b of the opposed portion are produced by segmentation, and an integrated iron core 101 of the first opposed portion is produced with a steel laminate at the time of assemblage. By changing the positions of the right and left iron cores 101 of the first opposed portion with each other, the iron core 102 of the second opposed portion is constituted. A support mechanism 32 and a duct 33 are interposed between the iron core 101 of the first opposed portion and the iron core 102 of the second opposed portion. As a result, a first member is formed in such a structure that the (2n−1)th iron core represents the first opposed portion and the (2n)th iron core represents the second opposed portion.

It is also possible that the iron core 101 of the first opposed portion and the iron core 102 of the second opposed portion are each segmented into left and right halves as units and the winding 4 is held by right and left sides for assemblage.

In any of the manufacturing methods described above, a combination is possible without regard to the type and shape of the second member.

The embodiments of the present invention are applicable to a multi-phase linear motor such as a four- or five-phase linear motor as well as the two- and three-phase linear motors described above.

Also, apart from the linear motor described above as embodiments of the invention, the first member and the second member of the embodiments may be such that an AC current is supplied to the winding 4 of the first member or the winding 57 of the second member and thus a linear actuator of oscillation type can be realized with the second member relatively reciprocating.

Figure 21A:
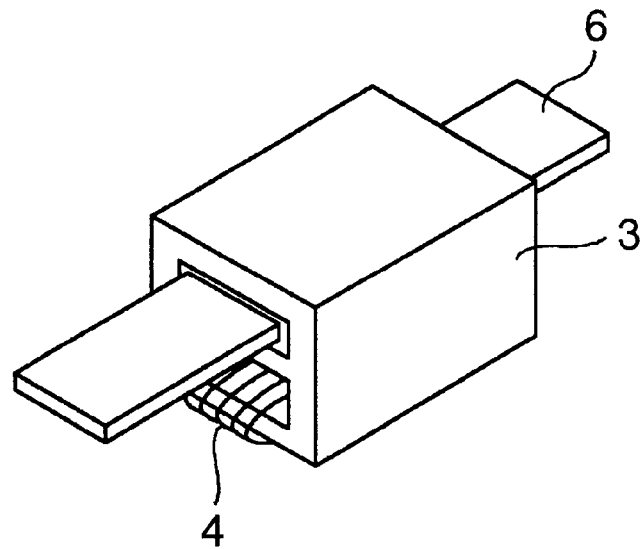
FIGS. 21A to 21B are schematic diagrams showing a parallel arrangement of the first members.
Figure 21B:
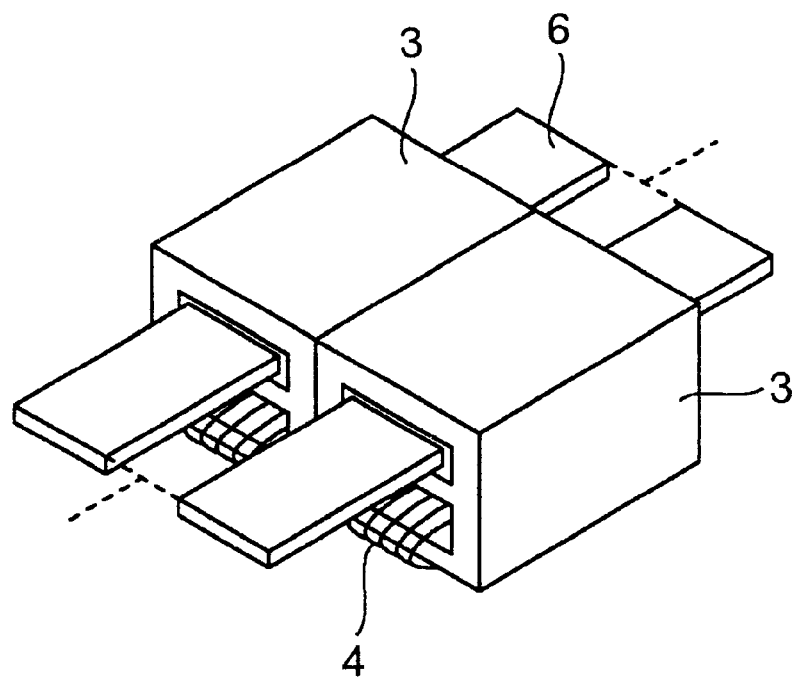

FIGS. 21A and 21B show the first members arranged in parallel according to an embodiment of the invention. FIG. 21A schematically shows a basic structure including a single mold of the first member 3 and the second member 6. FIG. 21B shows a parallel arrangement of two basic structures. A plurality of the first members 3 and a plurality of the second members 6 are each integrally coupled with each other, so that a plurality of the first members 3 are fixed while a plurality of the second members 6 are movable. As a result, a strong propulsive force can be easily generated. Alternatively, the second members 6 may be fixed while the first members 3 may be movable.

Figure 22A:
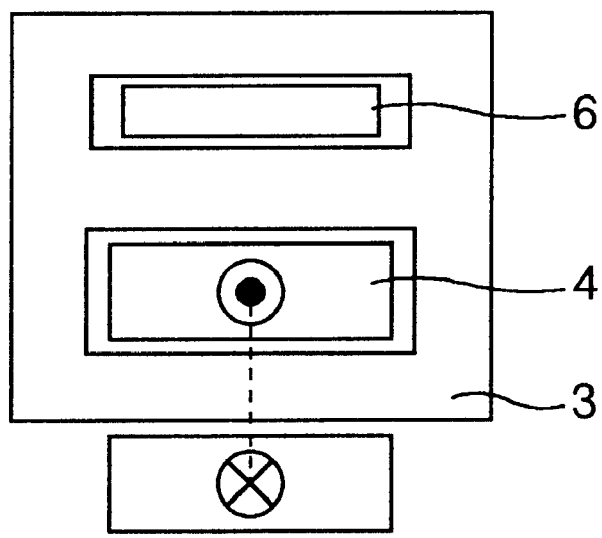
FIGS. 22A to 22B are schematic diagrams showing the arrangement of windings according to another embodiment.
Figure 22B:
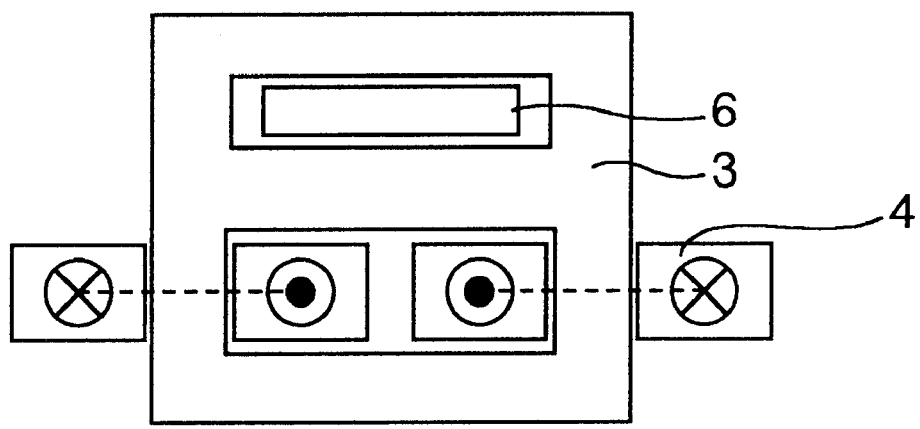

FIGS. 22A and 22B show winding arrangements according to another embodiment. Various methods of arranging windings on the iron core portion 3 of the first member are conceivable in FIGS. 22A and 22B. FIG. 22A shows a case in which the winding 4 is arranged in a single bundle in parallel to the second member 6 on the bottom of the iron core portion 3, and FIG. 22B a case in which the winding 4 is arranged in two bundles on the two sides of the iron core portion 3. In the case of FIG. 22A, the winding is not expanded laterally as viewed from the front and therefore the width can be reduced. In the case of FIG. 22B, on the other hand, the winding is not expanded vertically as viewed from the front, and therefore the vertical thickness can be reduced.

Figure 23A:
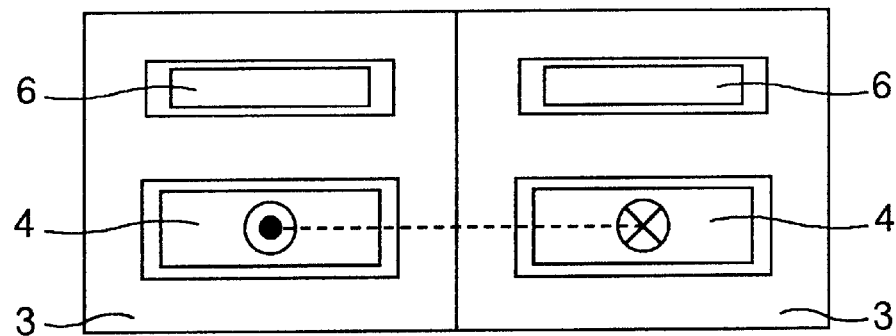
FIGS. 23A to 23B are front views showing the first members arranged in parallel (horizontally).
Figure 23B:
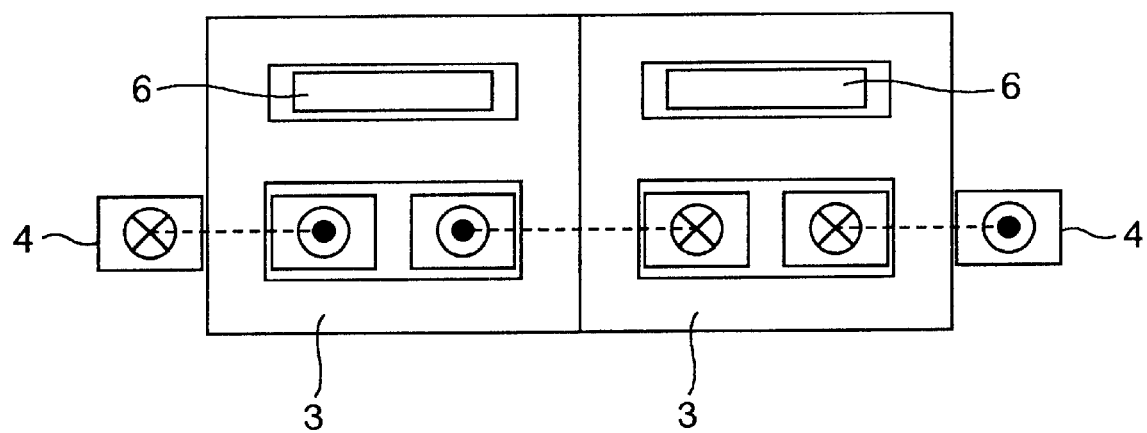

FIGS. 23A and 23B show front views of a parallel (horizontal) arrangement of the iron cores providing the first members 3. FIG. 23A shows an arrangement of the winding 4 extending over two adjacent iron cores, and FIG. 23B shows a case in which in addition to the winding arrangement of FIG. 23A, the winding 4 is additionally arranged on each of the two outer sides of each iron core portion. As a result, the windings 4 can be arranged freely even in the case where the iron cores making up the first members 3 are arranged in parallel.

Figure 24A:
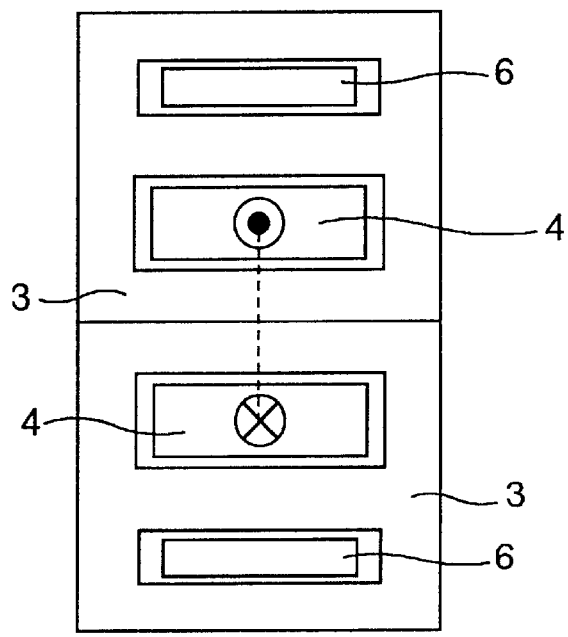
FIGS. 24A to 24B are front views showing the first members arranged in parallel (vertically).
Figure 24B:
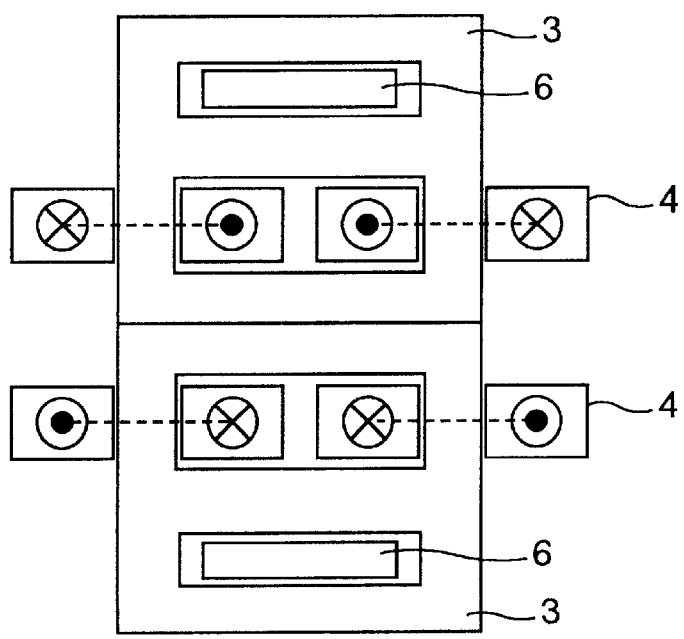

FIGS. 24A and 24B are front views showing another example of a parallel (vertical) arrangement of the iron core portions making up the first member.

FIG. 24A shows a case in which the back sides (the sides far from the mover making up the second members 6) of the iron core portions (first members 3) having the winding 4 wound thereon are arranged in vertically opposed relation to each other with the windings 4 arranged over the two iron core portions. FIG. 24B shows a similar case in which the back sides of the iron core portions (first members 3) are arranged in vertically opposed relation to each other with a plurality of sets (four sets are shown) of windings 4 are arranged vertical and horizontal positions. As a result, the windings 4 can be arranged freely even in the case where the iron cores making up the first members 3 are arranged in parallel.

Figure 25:
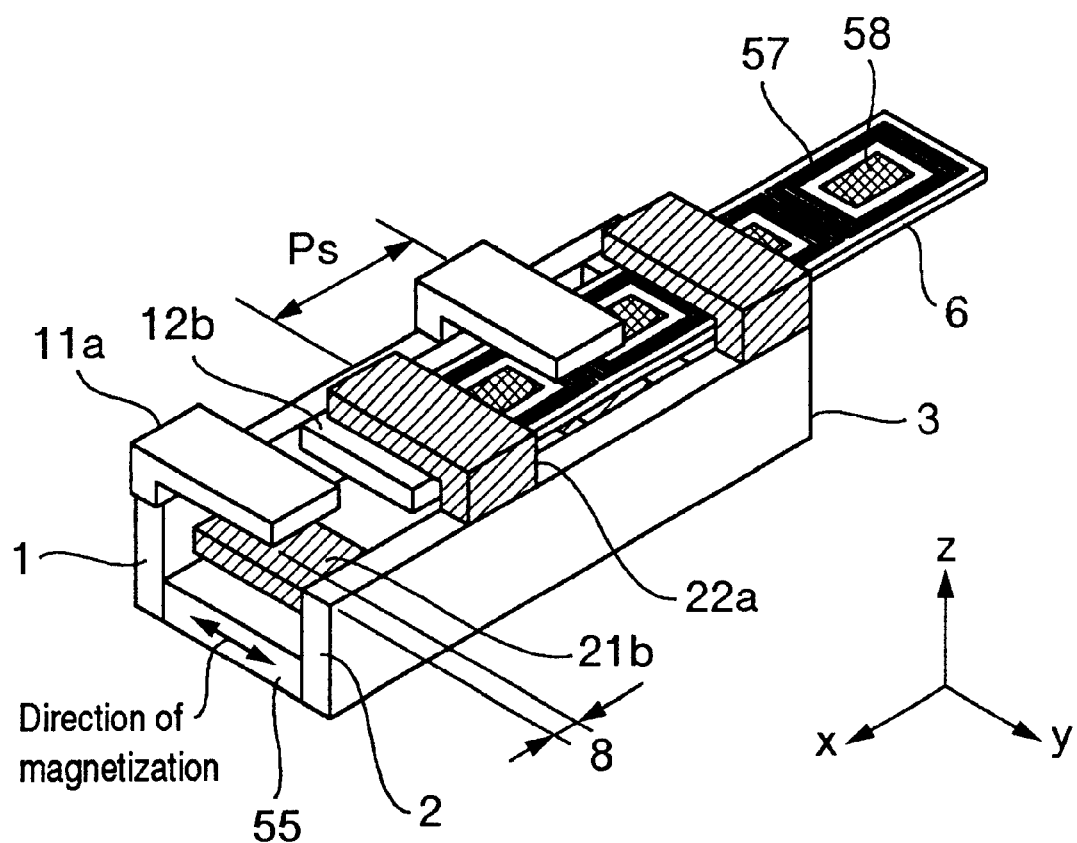
FIG. 25 is a schematic diagram showing the first member according to another embodiment of the invention.

FIG. 25 shows the first member 3 according to another embodiment. As shown in FIG. 25, this embodiment is such that the electromagnet including the winding 4 and the iron core 5 shown in FIG. 13 is replaced with a permanent magnet 55 having the direction of magnetization indicated by arrow. In this case, the winding 4 and hence the space for the winding 4 is eliminated for an improved space availability factor.

Figure 26:
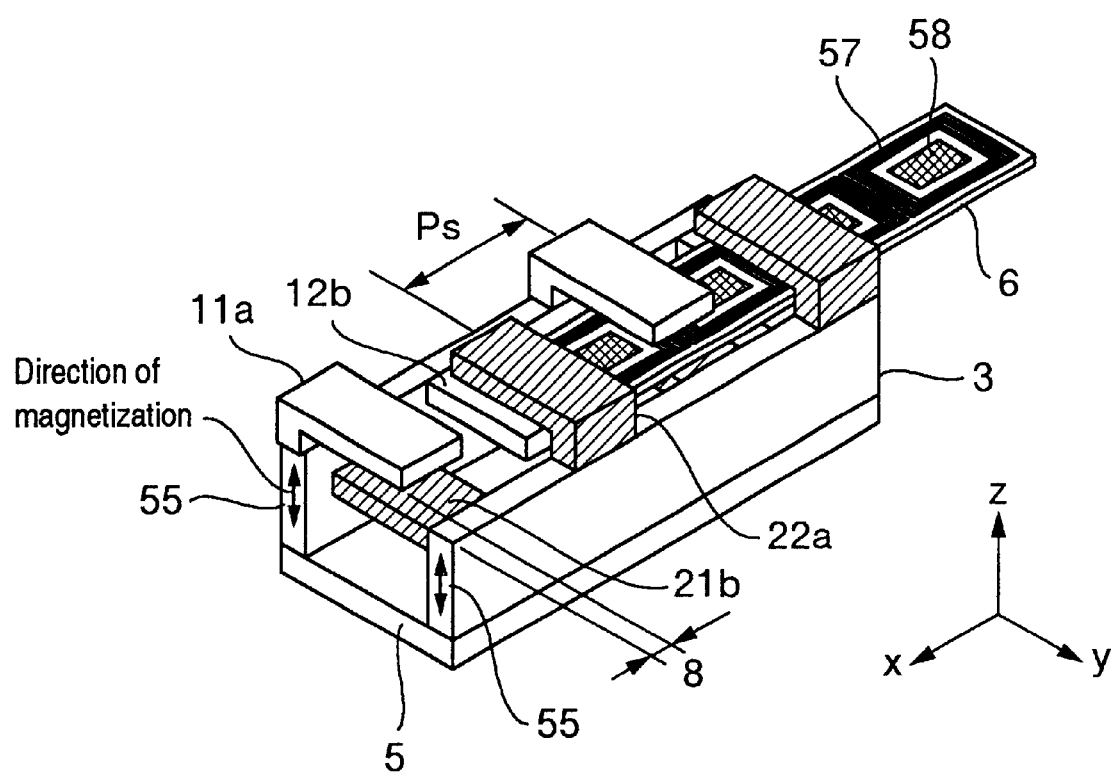
FIG. 26 is a schematic diagram showing the first member according to still another embodiment of the invention.

FIG. 26 shows the first member according to still another embodiment. In FIG. 26, the permanent magnet 55 according to the embodiment shown in FIG. 25 is arranged on the two sides of the iron core portion 3. This embodiment has a plurality of (two) permanent magnets 55 having the directions of magnetization indicated by arrows in FIG. 26. The winding 4 is not required also in this case, and therefore the saving of the space for the winding improves the space availability factor.

The permanent magnet shown in FIGS. 25 and 26, even when configured integrally, has the same effect from the viewpoint of the basic operating principle. Also, the permanent magnet may be assembled by producing in segmentations conforming to the pitch of the magnetic pole teeth.

Figure 27A:
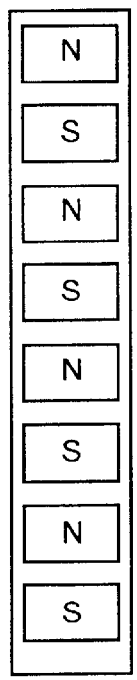
FIGS. 27A to 27D are schematic diagrams showing the magnetic poles of the second member arranged in skewed fashion.
Figure 27B:
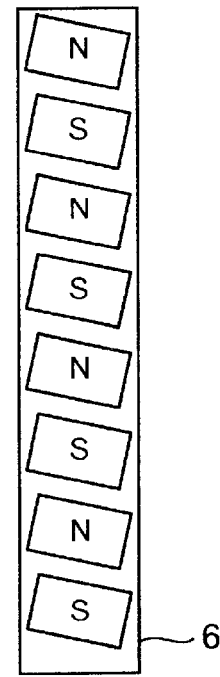
Figure 27C:
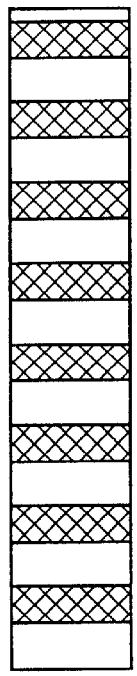
Figure 27D:
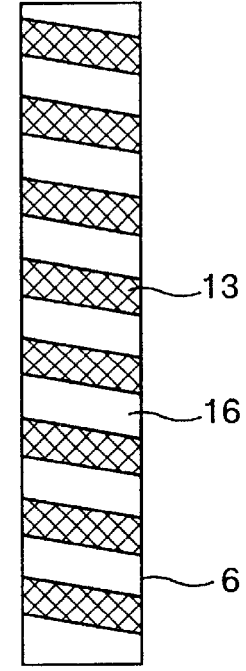

FIGS. 27A and 27B show an embodiment in which the magnetic poles of the second member 6 are skewed (arranged diagonally). FIG. 27B shows a second member 6 using permanent magnets with skewed magnetic poles, FIG. 27A shows a (normal) second member 6 not skewed, FIG. 27D shows the ferromagnetic material 13 of FIG. 11 with the magnetic poles thereof skewed (diagonally arranged), and FIG. 27C shows a (normal) ferromagnetic material 13 not skewed. The same effect can be obtained by skewing the composite second member 6 made of a permanent magnet and a ferromagnetic material. The skewing reduces the detent force for a smaller propulsion ripple.

It will thus be understood from the foregoing description that according the embodiments of the present invention, the magnetic path of the magnetic circuit of effective magnetic fluxes is shortened and the leakage magnetic fluxes of the magnetic pole teeth can be reduced. Also, in the linear motor according to this invention, the attraction force acting between the second member 6 and the upper magnetic pole teeth has the same magnitude as the attraction force exerted between the second member 6 and the lower magnetic pole teeth. At the same time, the attraction forces are exerted in opposite directions, thereby reducing the whole attraction force. As a result, the attraction force between the second member 6 and the magnetic pole teeth of the first member 3 can be reduced for a smaller burden on the support mechanisms 14, 15. Also, in view of the fact that the magnetic pole unit including an integration of the armature core wound with a coil, the magnetic poles on the two sides, the upper magnetic pole teeth and the lower magnetic pole teeth of the opposed portion is produced by segmenting the first member with a steel laminate, the linear motor according to the present invention can be easily and efficiently manufactured.

The present specification discloses the following.

(1) A linear motor comprising a first member and a second member, wherein the first member includes at least a magnetic pole of a first polarity having a first opposed portion and a magnetic pole of a second polarity having a second opposed portion, the second member is held by the first opposed portion, and the second member is held by the second opposed portion and adapted to move relatively.

(2) A linear motor comprising a first member and a second member, wherein the relative position of the second member perpendicular to the direction of relative movement thereof is held by the interaction between the first member and the second member.

(3) A linear motor described in (1) or (2) above, wherein the first member is made of an iron core and a winding, and the second member is made of a permanent magnet, a magnetic material or a single type of winding or a combination of a plurality of types of materials.

(4) A linear motor described in (1) or (2) above, wherein the first member is made of an iron core, a permanent magnet and a winding, and the second member is made of a permanent magnet, a magnetic material, a single type of winding or a combination of a plurality of types of materials.

(5) A linear motor described in (1) above, wherein the permanent magnet or the ferromagnetic material of the second member is skewed at the time of arrangement.

(6) A linear motor driving system described in any one of (1) to (5) above, wherein a closed loop control system is configured with a linear motor including the first member and the second member, a sensor for detecting the relative displacement of the first member and the second member and the magnetic poles thereof, a control unit for feeding back the signal of the sensor and a power drive unit.

(7) A linear motor driving system described in any one of (1) to (6) above, wherein an open loop control system is configured with a linear motor including the first member and the second member, a control unit and a power drive unit.

(8) A linear motor driving system described in any one of (1) to (7) above, wherein a control system is configured with a linear motor including the first member and the second member, a power drive unit, and a control unit including means for detecting the induced voltage of the linear motor and estimating the relative positions of the magnetic poles of the first member and the second member based on the voltage detection value.

(9) A linear motor driving system described in any one of (1) to (8) above, wherein a control system is configured with a linear motor including the first member and the second member, a power drive unit, and a control unit including means for detecting the current flowing in the linear motor and estimating the relative positions of the magnetic poles of the first member and the second member based on the current detection value.

(10) A method of manufacturing a linear motor including the first member and the second member described in any one of (1) to (9) above, wherein the first member is wound with a single excitation winding and the direction of the current flow is switched alternately by a drive circuit.

(11) A method of manufacturing a linear motor including the first member and the second member described in any one of (1) to (10) above, wherein two windings are wound in opposite directions on the same iron core of the first member, and the current in the same direction is supplied to the alternate windings by a drive circuit.

(12) A linear motor described in any one of (1) to (11) above, wherein a plurality of first members are arranged, and assuming that the pole pitch is given as P, the pitch between the adjacent magnetic pole teeth of the first member is expressed as $(k \cdot P + P/M)$ {k: 0, 1, 2, ..., and M: 2, 3, 4, ...}, where k is the number freely selectable within the range in which adjacent first members can be arranged, and M is the number of phases of the motor.

(13) A linear motor described in any one of (1) to (12) above, wherein a plurality of first members are arranged, and assuming that a multiplicity of first members represent one phase and the pole pitch is given as P, the pitch between the magnetic pole teeth of the adjacent first members of the same phase is expressed as (k·P) {k: 0, 1, 2, . . . ), and the pitch of the magnetic pole teeth of adjacent first members of different phases is expressed as (k·P+P/M) {k: 0, 1, 2, . . . , and M: 2, 3, 4, . . . }, where k is the number freely selectable within the range in which adjacent first members can be arranged, and M is the number of phases of the motor.

(14) A linear motor described in any one of (1) to (13), wherein the magnetic pole pitch of the first member and the magnetic pole pitch of the second member assume the same value or different values.

(15) A linear motor described in any one of (1) to (14), comprising a support mechanism for supporting the second member moving relatively in a gap of the first member.

(16) A method of manufacturing a linear motor including the first member and the second member, wherein the iron core portion with the winding of the first member arranged thereon and the magnetic pole portion having the opposed portion holding the second member are assembled by segmentation from a steel laminate.

(17) A method of manufacturing a linear motor including the first member and the second member, wherein a plurality of the iron cores of the first member are produced by segmentation vertically or horizontally with respect to the direction of relative movement of the first member and the second member, and the winding of the first member is accommodated in the iron core portion and integrated with the iron core produced by segmentation.

(18) A linear motor described in (1) above, comprising an armature formed of a magnetic material, a coil wound on the armature and a mover movable relatively to the armature by acting on the magnetic field generated by the armature, the linear motor further comprising a first magnetic pole tooth train magnetically coupled to one magnetic pole of the armature and arranged in first and second stages in the direction substantially perpendicular to the direction of movement of the mover, and a second magnetic pole tooth train magnetically coupled to the other magnetic pole of the armature and arranged in first and second stages in the direction substantially perpendicular to the direction of movement of the mover, wherein the magnetic pole teeth in the second stage of the first magnetic pole tooth train and the magnetic pole teeth in the second stage of the second magnetic tooth train are arranged alternately along the direction of movement of the mover, the magnetic pole teeth in the second stage of the first magnetic pole tooth train and the magnetic pole teeth in the second stage of the second magnetic tooth train are arranged alternately along the direction of movement of the mover, and the mover is arranged between the first and second magnetic pole tooth trains in the first stage and the first and second magnetic pole tooth trains in the second stage.

(19) A linear motor described in (18) above, wherein a plurality of armature units each including the armature, the coil and the first and second magnetic pole tooth trains are arranged, and assuming that the pole pitch is given as P, the pitch of the magnetic pole tooth trains of adjacent armature units is expressed as (k·P+P/M) {k: 0, 1, 2, . . . , and M: 2, 3, 4, . . . }, where k is the number freely selectable within the range in which adjacent armature units can be arranged, and M is the number of phases of the motor.

(20) A linear motor described in (18) or (19) above, wherein a plurality of armature units each including the armature, the coil and the first and second magnetic pole tooth trains are arranged, and assuming that a multiplicity of armature units represent one phase and the pole pitch is given as P, the pitch of the magnetic pole tooth trains of adjacent armature units of the same phase is expressed as (k·P) {k: 0, 1, 2, . . . ), and the pitch of the magnetic pole tooth trains of adjacent armature units of different phases is expressed as (k·P+P/M) {k: 0, 1, 2, . . . , and M: 2, 3, 4, . . . }, where k is the number freely selectable within the range in which adjacent armature units can be arranged, and M is the number of the phases of the motor.

(21) A linear motor described in any one of (18) to (20) above, wherein the pitch of the magnetic pole tooth trains of the armature unit including the armature, the coil and the first and second magnetic pole tooth trains assumes a value identical to or different from the pitch of the magnetic poles of the mover.

(22) A linear motor comprising an armature formed of a magnetic material, a coil wound on the armature and a mover acting on the magnetic field generated by the armature, the mover being fixedly supported, the armature being movable relatively, the linear motor further comprising a first magnetic pole tooth train magnetically coupled to one magnetic pole of the armature and arranged in first and second stages in the direction substantially perpendicular to the direction of movement of the mover, and a second magnetic pole tooth train magnetically coupled to the other magnetic pole of the armature and arranged in first and second stages in the direction substantially perpendicular to the direction of movement of the mover, wherein the magnetic pole teeth in the first stage of the first magnetic pole tooth train and the magnetic pole teeth in the first stage of the second magnetic tooth train are arranged alternately along the direction of movement of the mover, the magnetic pole teeth in the second stage of the first magnetic pole tooth train and the magnetic pole teeth in the second stage of the second magnetic tooth train are arranged alternately along the direction of movement of the mover, and the mover is arranged between the first and second magnetic pole tooth trains in the first stage and the first and second magnetic pole tooth trains in the second stage.

(23) A method of manufacturing a linear motor comprising an armature formed of a magnetic material, a coil wound on the armature and a mover movable relatively to the armature by acting on the magnetic field generated by the armature, wherein the armature, first and second magnetic poles and first and second magnetic pole tooth trains are produced as an integrated magnetic pole unit by segmentation from a steel laminate, and the magnetic pole units produced by segmentation are assembled to configure the linear motor.

To summarize, there is provided a linear motor comprising a first member and a second member, wherein the first member includes at least a magnetic pole of a first magnetic polarity having a first opposed portion and a magnetic pole of a second magnetic polarity having a second opposed portion, the second member is held by the first opposed portion and also held by the second opposed portion for relative movement. The first member is made of an iron core and a winding, and the second member is made of a permanent magnet, a magnetic material, a single type of winding or a combination of a plurality of types of materials. As a result, the magnetic attraction force generated between the armature and the mover can be reduced by reducing the leakage of the magnetic fluxes passing through the gap between the magnetic pole teeth of the armature.

According to this invention, there is provided a linear motor and a method of manufacturing the linear motor, in which the leakage of the magnetic fluxes passing through the gap between the magnetic pole teeth is reduced thereby to reduce the magnetic attraction force between the armature and the mover.

What is claimed is:

1. A linear motor comprising:
    a first member; and
    a second member;
    wherein said first member includes a core having first portions opposed to each other through a first gap and a core having second portions opposed to each other through a second gap,
    wherein the magnetic polarity of said first portions, and the magnetic polarity of said second portions are different,
    said core having first portions and said core having second portions are arranged alternately,
    said second member is arranged in said first gap and said second gap, and
    said core having first portions and said core having second portions include a common coil.

2. A linear motor according to claim 1, wherein said first member is made of an iron core and a winding, and said second member is made of a permanent magnet, a magnetic material and a winding of a single type or a combination of a plurality of types of materials.

3. A linear motor according to claim 1, wherein said first member is made of an iron core, a permanent magnet and a winding, and said second member is made of a permanent magnet, a magnetic material, a winding of a single type or a combination of a plurality of types of materials.

4. A linear motor according to claim 2, wherein said permanent magnet and said ferromagnetic material of said second member are arranged in skewed fashion.

5. A linear motor according to claim 1, wherein said linear motor wherein said first member is wound with a single excitation winding and the direction of the current flow is switched alternately by a drive circuit.

6. A linear motor according to claim 1, wherein two windings are wound in opposite directions on the same iron core of said first member, and the current in the same direction is supplied to the alternate windings by a drive circuit.

7. A linear motor according to claim 1, wherein a plurality of first members are arranged, and assuming that said pole pitch is given as P, the pitch between the magnetic pole teeth of adjacent ones of said first members is expressed as (k·P+P/M) {k: 0, 1, 2, . . . , and M: 2, 3, 4, . . . . }, where k is the number freely selectable within the range in which adjacent first members can be arranged, and M is the number of phases of said motor.

8. A linear motor according to claim 1, wherein a plurality of first members are arranged, and assuming that a multiplicity of first members represent one phase and the pole pitch is given as P, the pitch between the magnetic pole teeth of adjacent ones of said first members of the same phase is expressed as (k·P) {k: 0, 1, 2, . . . , }, and the pitch of the magnetic pole teeth of adjacent ones of said first members of different phases is expressed as (k·P+P/M) {k: 0, 1, 2, . . . , and M: 2, 3, 4, . . . }, where k is the number freely selectable within the range in which adjacent first members can be arranged, and M is the number of phases of said motor.

9. A linear motor according to claim 1, comprising a support mechanism for supporting said second member moving relatively in a gap of said first member.

10. A linear motor according to claim 1, comprising an armature formed of a magnetic material having two poles, a coil wound on said armature and a mover movable relatively to said armature by acting on a magnetic field generated by said armature,
    said linear motor further comprising:
    a first magnetic pole tooth train magnetically coupled to one magnetic pole of said armature and arranged in first and second stages in the direction substantially perpendicular to the direction of movement of said mover, and
    a second magnetic pole tooth train magnetically coupled to an other magnetic pole of said armature and arranged in first and second stages in the direction substantially perpendicular to the direction of movement of said mover,
    wherein the magnetic pole teeth in said first stage of said first magnetic pole tooth train and the magnetic pole teeth in said first stage of said second magnetic tooth train are arranged alternately along the direction of movement of said mover,
    wherein said magnetic pole teeth in said second stage of said first magnetic pole tooth train and said magnetic pole teeth in said second stage of said second magnetic tooth train are arranged alternately along the direction of movement of said mover, and
    wherein said mover is arranged between said first and second magnetic pole tooth trains in said first stage and said first and second magnetic pole tooth trains in said second stage.

11. A linear motor according to claim 10, wherein a plurality of armature units each including said armature, said coil and said first and second magnetic pole tooth trains are arranged, and assuming that the pole pitch is given as P, the pitch of the magnetic pole tooth trains of adjacent ones of said armature units is expressed as (k·P+P/M) {k: 0, 1, 2, . . . , and M: 2, 3, 4, . . . }, where k is the number freely selectable within the range in which adjacent armature units can be arranged, and M is the number of phases of said motor.

12. A linear motor according to claim 10, wherein a plurality of armature units each including said armature, said coil and said first and second magnetic pole tooth trains are arranged, and assuming that a multiplicity of armature units represent one phase and the pole pitch is given as P, the pitch of the magnetic pole tooth trains of adjacent ones of said armature units of the same phase is expressed as (k·P) {k: 0, 1, 2, . . . }, and the pitch of the magnetic pole tooth trains of adjacent ones of said armature units of different phases is expressed as (k·P+P/M) {k: 0, 1, 2, . . . , and M: 2, 3, 4, . . . }, where k is the number freely selectable within the range in which adjacent armature units can be arranged, and M is the number of phases of said motor.

13. A linear motor according to claim 10, wherein the pitch of the magnetic pole tooth trains of said armature unit including said armature, said coil and said first and second magnetic pole tooth trains assumes a value identical to or different from the pitch of the magnetic poles of said mover.

14. A linear motor according to claim 1, wherein the pitch of the magnetic poles of said first member and the pitch of the magnetic poles of said second member have the same value.

15. A linear motor according to claim 1, wherein the relative position in the direction perpendicular to the direction of relative movement of said first member is held by the interaction between the first member and the second member.

16. A linear motor according to claim 15, wherein the first member is made of an iron core and a winding, and the second member is made of a permanent magnet, a magnetic material and a winding of a single type of material or a combination of a plurality of types of materials.

17. A linear motor according to claim 15, wherein the first member is made of an iron core, a permanent magnet and a winding, and the second member is made of a permanent magnet, a magnetic material, a winding of a single type of material or a combination of a plurality of types of materials.

18. A linear motor according to claim 15, wherein the permanent magnet or the ferromagnetic material of the second member is arranged in skewed fashion.

19. A linear motor comprising:
   a first member; and
   a second member;
   wherein said first member includes a core having first portions opposed to each other through a first gap and a core having second portions opposed to each other through a second gap,
   wherein the magnetic polarity of said first portions, and the magnetic polarity of said second portions are different,
   said core having first portions and said core having second portions are arranged alternately,
   said second member is arranged in said first gap and said second gap, and
   said core having first portions and said core having second portions include a common coil,
   wherein a pitch of magnetic poles of said first member and a pitch of magnetic poles of said second member assume different values.

20. A linear motor comprising a first member formed of a magnetic material, a coil wound on said first member and a second member acting on a magnetic field generated by said first member, said second member being fixedly supported, said first member being movable relatively,
   said linear motor further comprising:
   a first magnetic pole tooth train magnetically coupled to one magnetic pole of said first member and arranged in first and second stages in the direction substantially perpendicular to the direction of movement of said first member, and
   a second magnetic pole tooth train magnetically coupled to an other magnetic pole of said first member and arranged in first and second stages in the direction substantially perpendicular to the direction of movement of said first member;
   wherein said magnetic pole teeth in said first stage of said first magnetic pole tooth train and said magnetic pole teeth in said first stage of said second magnetic tooth train are arranged alternately along the direction of movement of said first member,
   wherein said magnetic pole teeth in said second stage of said first magnetic pole tooth train and said magnetic pole teeth in said second stage of said second magnetic tooth train are arranged alternately along the direction of movement of said first member, and
   wherein said second member is arranged between said first and second magnetic pole tooth trains in said first stage and said first and second magnetic pole tooth trains in said second stage.

21. A linear motor driving system comprising a closed loop control system including:
   a linear motor includes an armature of magnetic material having two poles;
   a coil wound on said armature;
   a mover movable relatively to said armature;
   a sensor for detecting the relative displacement of said mover to said armature;
   a control unit for feeding back the signal from said sensor; and said linear motor further comprising:
   a first magnetic pole tooth train magnetically coupled to one magnetic pole of said armature and arranged in first and second stages in the direction substantially perpendicular to the direction of movement of said mover;
   a second magnetic pole tooth train magnetically coupled to an other magnetic pole of said armature and arranged in first and second stages in the direction substantially perpendicular to the direction of movement of said mover;
   wherein the magnetic pole teeth in said first stage of said first magnetic pole tooth train and the magnetic pole teeth in said first stage of said second magnetic tooth train are arranged alternately along the direction of movement of said mover;
   wherein said magnetic pole teeth in said second stage of said first magnetic pole tooth train and said magnetic pole teeth in said second stage of said second magnetic tooth train are arranged alternately along the direction of movement of said mover; and
   wherein said mover is arranged between said first and second magnetic pole tooth trains in said first stage and said first and second magnetic pole tooth trains in said second stage.

22. A linear motor driving system comprising an open loop control system including:
   a linear motor includes an armature of magnetic material having two poles;
   a coil wound on said armature;
   a mover movable relatively to said armature; and said linear motor further comprising:
   a first magnetic pole tooth train magnetically coupled to one magnetic pole of said armature and arranged in first and second stages in the direction substantially perpendicular to the direction of movement of said mover;
   a second magnetic pole tooth train magnetically coupled to an other magnetic pole of said armature and arranged in first and second stages in the direction substantially perpendicular to the direction of movement of said mover;
   wherein the magnetic pole teeth in said first stage of said first magnetic pole tooth train and the magnetic pole teeth in said first stage of said second magnetic tooth train are arranged alternately along the direction of movement of said mover;
   wherein said magnetic pole teeth in said second stage of said first magnetic pole tooth train and said magnetic pole teeth in said second stage of said second magnetic tooth train are arranged alternately along the direction of movement of said mover; and wherein said mover is arrange between said first and second magnetic pole tooth trains in said first stage and said first and second magnetic pole tooth trains in said second stage.

23. A linear motor driving system according to claim 21, comprising a control system including:

a linear motor including said armature and said mover; a power drive unit; and a control unit including means for detecting the induced voltage of the linear motor and estimating the relative positions of the magnetic poles of said armature and said mover based on said voltage detection value.

24. A linear motor driving system according to claim 21, comprising a control system including: a linear motor including said armature and said mover; a power drive unit; and a control unit including means for detecting the current flowing in said linear motor and estimating the relative positions of the magnetic poles of said armature and said mover based on said current detection value.

25. A linear motor comprising:

a first member; and a second member;

wherein said first member includes a first core having a first upper portion and a first lower portion opposed to each other through a first gap, and a second core having a second upper portion and a second lower portion opposed to each other through a second gap, wherein a magnetic polarity of said first upper portion is different from a magnetic polarity of said first lower portion, and a magnetic polarity of said second upper portion is different from a magnetic polarity of said second lower portion, said first core and said second core being arranged alternately, said second member being arranged in said first gap and said second gap, and said first core and said second core include a common coil.

26. A linear motor according to claim 25, wherein a plurality of windings are wound in opposite directions on said first and said second core of said first member, and current in a same direction is supplied to alternate windings by a drive circuit.

27. A linear motor according to claim 25, wherein a relative position in a direction perpendicular to a direction of relative movement of said first member is held by an interaction between said first member and said second member.

28. A linear motor comprising:

a first member; and a second member;

wherein said first member includes a first core having a first upper portion and a first lower portion opposed to each other through a first gap, and a second core having a second upper portion and a second lower portion opposed to each other through a second gap, wherein a magnetic polarity of said first upper portion is different from a magnetic polarity of said first lower portion, and a magnetic polarity of said second upper portion is different from a magnetic polarity of said second lower portion, said first core and said second core being arranged alternately, said second member being arranged in said first gap and said second gap, and said first core and said second core include a common coil, wherein a pitch of magnetic poles of said first member and a pitch of magnetic poles of said second member assume different values.

* * * * *